United States Patent
Wu et al.

(10) Patent No.: US 12,212,512 B2
(45) Date of Patent: Jan. 28, 2025

(54) TECHNIQUES FOR SIDELINK REFERENCE SIGNAL TRANSMISSION

(71) Applicant: QUALCOMM Incorporated, San Diego, CA (US)

(72) Inventors: Shuanshuan Wu, San Diego, CA (US); Kapil Gulati, Belle Mead, NJ (US); Dan Vassilovski, Del Mar, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 420 days.

(21) Appl. No.: 17/341,022

(22) Filed: Jun. 7, 2021

(65) Prior Publication Data

US 2022/0393815 A1  Dec. 8, 2022

(51) Int. Cl.
*H04L 5/00* (2006.01)
*H04W 74/0808* (2024.01)

(52) U.S. Cl.
CPC .......... *H04L 5/0048* (2013.01); *H04L 5/0078* (2013.01); *H04W 74/0808* (2013.01)

(58) Field of Classification Search
CPC ..... H04L 5/0048; H04L 5/0078; H04L 5/001; H04W 74/0808
See application file for complete search history.

(56) References Cited

U.S. PATENT DOCUMENTS

| | | | |
|---|---|---|---|
| 2020/0252910 A1* | 8/2020 | Wu | H04W 72/04 |
| 2021/0058891 A1 | 2/2021 | Huang et al. | |
| 2021/0297210 A1* | 9/2021 | Seo | H04L 5/0044 |
| 2022/0229146 A1* | 7/2022 | Ko | G01S 5/02216 |
| 2022/0279581 A1* | 9/2022 | Baek | G01S 13/765 |
| 2022/0365163 A1* | 11/2022 | Baek | H04W 4/40 |
| 2023/0022666 A1* | 1/2023 | Wu | H04L 5/0048 |
| 2023/0221397 A1* | 7/2023 | Baek | H04L 5/005 |
| | | | 455/456.1 |

FOREIGN PATENT DOCUMENTS

| | | |
|---|---|---|
| CN | 112203223 B | 3/2021 |
| WO | WO-2021040501 A1 | 3/2021 |

OTHER PUBLICATIONS

International Search Report and Written Opinion—PCT/US2022/028764—ISA/EPO—Aug. 2, 2022.

* cited by examiner

*Primary Examiner* — Justin T Van Roie
(74) *Attorney, Agent, or Firm* — Dalei Dong; Holland & Hart LLP

(57) ABSTRACT

Methods, systems, and devices for wireless communications are described. A first user equipment (UE) may communicate with a second UE using a shared radio frequency spectrum band. The first UE may perform a listen before talk (LBT) and may transmit a first positioning reference signal (PRS) based on a result of the LBT. The first UE may transmit the first PRS using a first time resource that is based on a duration of the first PRS. In response to detecting the first PRS, the second UE may transmit a second PRS using a second time resource that is based on the duration of the first PRS. The second UE may transmit the second PRS based on performing an LBT without a random back-off, which may enable the second UE to transmit the second PRS with reduced latency and improved reliability.

28 Claims, 13 Drawing Sheets

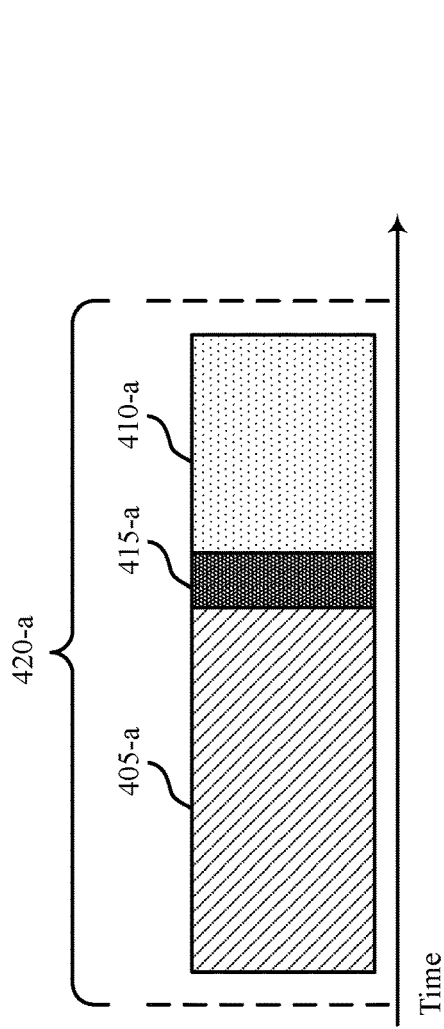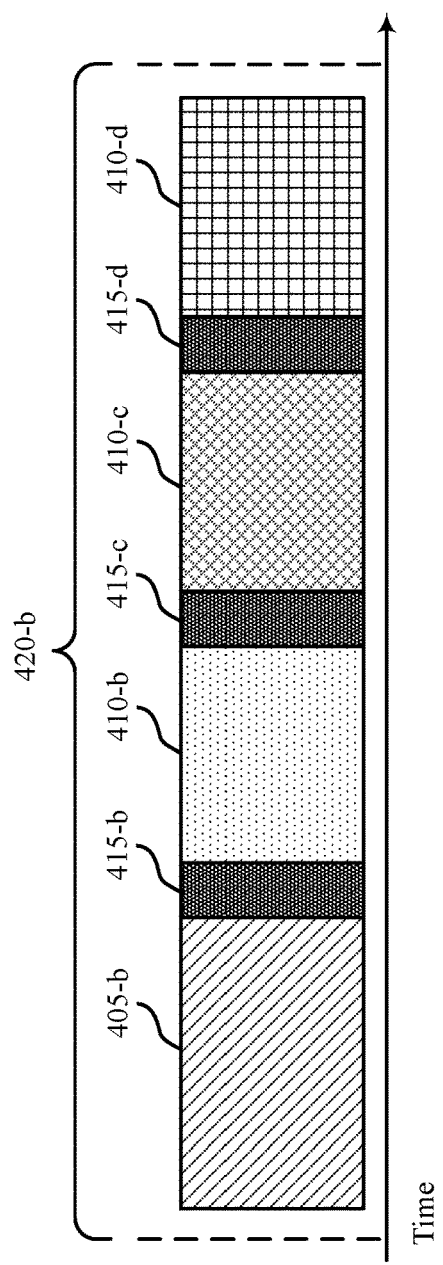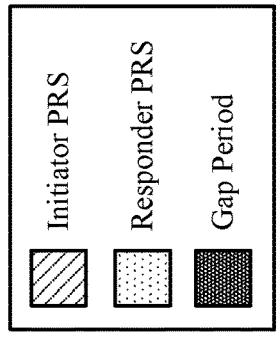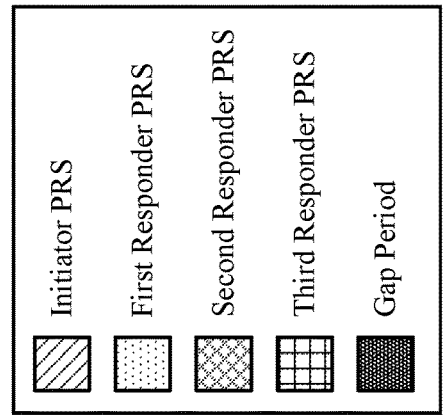
FIG. 4A
FIG. 4B

TECHNIQUES FOR SIDELINK REFERENCE SIGNAL TRANSMISSION

FIELD OF DISCLOSURE

The present disclosure relates to wireless communications, including techniques for sidelink reference signal transmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a first UE may perform a sidelink positioning procedure with a second UE in an unlicensed radio frequency spectrum band using one or more reference signals. In some cases, existing techniques for sidelink positioning may be deficient.

SUMMARY

The described techniques relate to improved methods, systems, devices, and apparatuses that support techniques for sidelink reference signal transmission. The described techniques provide for performing a sidelink positioning procedure in a shared (e.g., unlicensed) radio frequency spectrum band. A first user equipment (UE) may communicate with a second UE using the shared radio frequency spectrum band. The first UE may perform a listen before talk (LBT) and may transmit a first positioning reference signal (PRS) based on a result of the LBT. A second UE may transmit a second PRS based on receiving the first PRS. In some examples, a duration of the first PRS may enable the second UE to perform an LBT without a random back-off prior to transmitting the second PRS. As a result, the second UE may transmit the second PRS with reduced latency and improved reliability, among other benefits.

A method for wireless communications at a first user equipment (UE) is described. The method may include performing a listen before talk associated with a sidelink reference signal transmission using a shared radio frequency spectrum band, the sidelink reference signal transmission associated with sidelink positioning for the first UE, a second UE, or both, transmitting a first reference signal to the second UE using a first time resource, the first time resource based on a result of the performed listen before talk and a duration of the first reference signal, and monitoring for a second reference signal from the second UE using a second time resource, the second time resource based on the duration of the first reference signal.

An apparatus for wireless communications at a first UE is described. The apparatus may include a processor, memory coupled with the processor, and instructions stored in the memory. The instructions may be executable by the processor to cause the apparatus to perform a listen before talk associated with a sidelink reference signal transmission using a shared radio frequency spectrum band, the sidelink reference signal transmission associated with sidelink positioning for the first UE, a second UE, or both, transmit a first reference signal to the second UE using a first time resource, the first time resource based on a result of the performed listen before talk and a duration of the first reference signal, and monitor for a second reference signal from the second UE using a second time resource, the second time resource based on the duration of the first reference signal.

Another apparatus for wireless communications at a first UE is described. The apparatus may include means for performing a listen before talk associated with a sidelink reference signal transmission using a shared radio frequency spectrum band, the sidelink reference signal transmission associated with sidelink positioning for the first UE, a second UE, or both, means for transmitting a first reference signal to the second UE using a first time resource, the first time resource based on a result of the performed listen before talk and a duration of the first reference signal, and means for monitoring for a second reference signal from the second UE using a second time resource, the second time resource based on the duration of the first reference signal.

A non-transitory computer-readable medium storing code for wireless communications at a first UE is described. The code may include instructions executable by a processor to perform a listen before talk associated with a sidelink reference signal transmission using a shared radio frequency spectrum band, the sidelink reference signal transmission associated with sidelink positioning for the first UE, a second UE, or both, transmit a first reference signal to the second UE using a first time resource, the first time resource based on a result of the performed listen before talk and a duration of the first reference signal, and monitor for a second reference signal from the second UE using a second time resource, the second time resource based on the duration of the first reference signal.

Some examples of the method, apparatuses, and non-transitory computer-readable medium described herein may further include operations, features, means, or instructions for receiving, from a base station, broadcast signaling indicating a reference signal configuration, where the duration of the first reference signal may be based on the received broadcast signaling.

Some examples of the method, apparatuses, and non-transitory computer-readable medium described herein may further include operations, features, means, or instructions for receiving a message from the second UE indicating a processing capability associated with the first reference signal, a processing time associated with the first reference signal, a requested duration of the first reference signal, or a combination thereof, where the duration of the first reference signal may be based on the received message.

In some examples of the method, apparatuses, and non-transitory computer-readable medium described herein, the monitoring for the second reference signal using the second time resource may be based on maintaining a gap period between the first time resource and the second time resource.

Some examples of the method, apparatuses, and non-transitory computer-readable medium described herein may further include operations, features, means, or instructions for transmitting a message to the second UE indicating a duration of the gap period.

Some examples of the method, apparatuses, and non-transitory computer-readable medium described herein may further include operations, features, means, or instructions for monitoring for a third reference signal from a third UE using a third time resource, the third time resource based on the duration of the first reference signal.

Some examples of the method, apparatuses, and non-transitory computer-readable medium described herein may further include operations, features, means, or instructions for receiving signaling indicating a first processing time at the second UE and a second processing time at the third UE, where the first processing time at the second UE may be greater than the second processing time at the third UE, and where the duration of the first reference signal may be based on the first processing time at the second UE.

In some examples of the method, apparatuses, and non-transitory computer-readable medium described herein, the second time resource may be before the third time resource and the duration of the first reference signal may be based on the first processing time at the second UE.

Some examples of the method, apparatuses, and non-transitory computer-readable medium described herein may further include operations, features, means, or instructions for transmitting a group configuration message to the second UE and the third UE, where monitoring for the second reference signal and the third reference signal may be based on the transmitted group configuration message.

In some examples of the method, apparatuses, and non-transitory computer-readable medium described herein, the group configuration message indicates a transmission order associated with the second reference signal and the third reference signal, a second duration of the second reference signal, a third duration of the third reference signal, or any combination thereof.

Some examples of the method, apparatuses, and non-transitory computer-readable medium described herein may further include operations, features, means, or instructions for receiving signaling indicating a configuration associated with a second duration of the second reference signal, where monitoring for the second reference signal using the second time resource may be based on the received signaling.

In some examples of the method, apparatuses, and non-transitory computer-readable medium described herein, the duration of the first reference signal includes a quantity of symbols, the quantity of symbols greater than a first threshold quantity of symbols and less than a second threshold quantity of symbols.

Some examples of the method, apparatuses, and non-transitory computer-readable medium described herein may further include operations, features, means, or instructions for transmitting a message to the second UE, the transmitted message indicating a second duration of the second reference signal, where monitoring for the second reference signal using the second time resource may be based on the transmitted message.

Some examples of the method, apparatuses, and non-transitory computer-readable medium described herein may further include operations, features, means, or instructions for initiating a channel occupancy based on the result of the performed listen before talk, where the channel occupancy includes the first time resource and the second time resource.

A method for wireless communications at a first UE is described. The method may include communicating with a second UE using a shared radio frequency spectrum band, receiving a first reference signal from the second UE using a first time resource, and transmitting a second reference signal to the second UE using a second time resource, the second time resource based on a duration of the received first reference signal.

An apparatus for wireless communications at a first UE is described. The apparatus may include a processor, memory coupled with the processor, and instructions stored in the memory. The instructions may be executable by the processor to cause the apparatus to communicate with a second UE using a shared radio frequency spectrum band, receive a first reference signal from the second UE using a first time resource, and transmit a second reference signal to the second UE using a second time resource, the second time resource based on a duration of the received first reference signal.

Another apparatus for wireless communications at a first UE is described. The apparatus may include means for communicating with a second UE using a shared radio frequency spectrum band, means for receiving a first reference signal from the second UE using a first time resource, and means for transmitting a second reference signal to the second UE using a second time resource, the second time resource based on a duration of the received first reference signal.

A non-transitory computer-readable medium storing code for wireless communications at a first UE is described. The code may include instructions executable by a processor to communicate with a second UE using a shared radio frequency spectrum band, receive a first reference signal from the second UE using a first time resource, and transmit a second reference signal to the second UE using a second time resource, the second time resource based on a duration of the received first reference signal.

Some examples of the method, apparatuses, and non-transitory computer-readable medium described herein may further include operations, features, means, or instructions for receiving, from a base station, broadcast signaling indicating a reference signal configuration, where the duration of the received first reference signal may be based on the received broadcast signaling.

In some examples of the method, apparatuses, and non-transitory computer-readable medium described herein, communicating with the second UE may include operations, features, means, or instructions for transmitting a message to the second UE, the transmitted message indicating a processing capability associated with the first reference signal, a processing time associated with the first reference signal, a requested duration of the first reference signal, or any combination thereof, where the duration of the received first reference signal may be based on the transmitted message.

In some examples of the method, apparatuses, and non-transitory computer-readable medium described herein, the transmitted second reference signal may be transmitted using the second time resource based on maintaining a gap period between the first time resource and the second time resource.

In some examples of the method, apparatuses, and non-transitory computer-readable medium described herein, communicating with the second UE may include operations, features, means, or instructions for receiving a message from the second UE, the received message indicating a duration of the gap period.

In some examples of the method, apparatuses, and non-transitory computer-readable medium described herein, communicating with the second UE may include operations, features, means, or instructions for receiving a group configuration message from the second UE, where the transmitted second reference signal may be transmitted using the second time resource based on the received group configuration message.

In some examples of the method, apparatuses, and non-transitory computer-readable medium described herein, the group configuration message indicates a transmission order associated with the transmitted second reference signal, a second duration of the transmitted second reference signal, or both.

Some examples of the method, apparatuses, and non-transitory computer-readable medium described herein may further include operations, features, means, or instructions for receiving signaling indicating a configuration associated with a second duration of the second reference signal, where the transmitted second reference signal may be transmitted using the second time resource based on the received signaling.

In some examples of the method, apparatuses, and non-transitory computer-readable medium described herein, the duration of the received first reference signal includes a quantity of symbols, the quantity of symbols greater than a first threshold quantity of symbols and less than a second threshold quantity of symbols.

In some examples of the method, apparatuses, and non-transitory computer-readable medium described herein, a second duration of the transmitted second reference signal includes a quantity of symbols, the quantity of symbols greater than a first threshold quantity of symbols and less than a second threshold quantity of symbols.

In some examples of the method, apparatuses, and non-transitory computer-readable medium described herein, a second duration of the transmitted second reference signal may be based on a processing capability associated with a third UE.

In some examples of the method, apparatuses, and non-transitory computer-readable medium described herein, communicating with the second UE may include operations, features, means, or instructions for receiving a message from the second UE, the received message indicating a second duration of the second reference signal, where the second reference signal may be transmitted using the second time resource based on the transmitted message.

BRIEF DESCRIPTION OF THE DRAWINGS

FIGS. 4A and 4B illustrate examples of communication schedules that support techniques for sidelink reference signal transmission in accordance with various aspects of the present disclosure.

DETAILED DESCRIPTION

Figure 1:
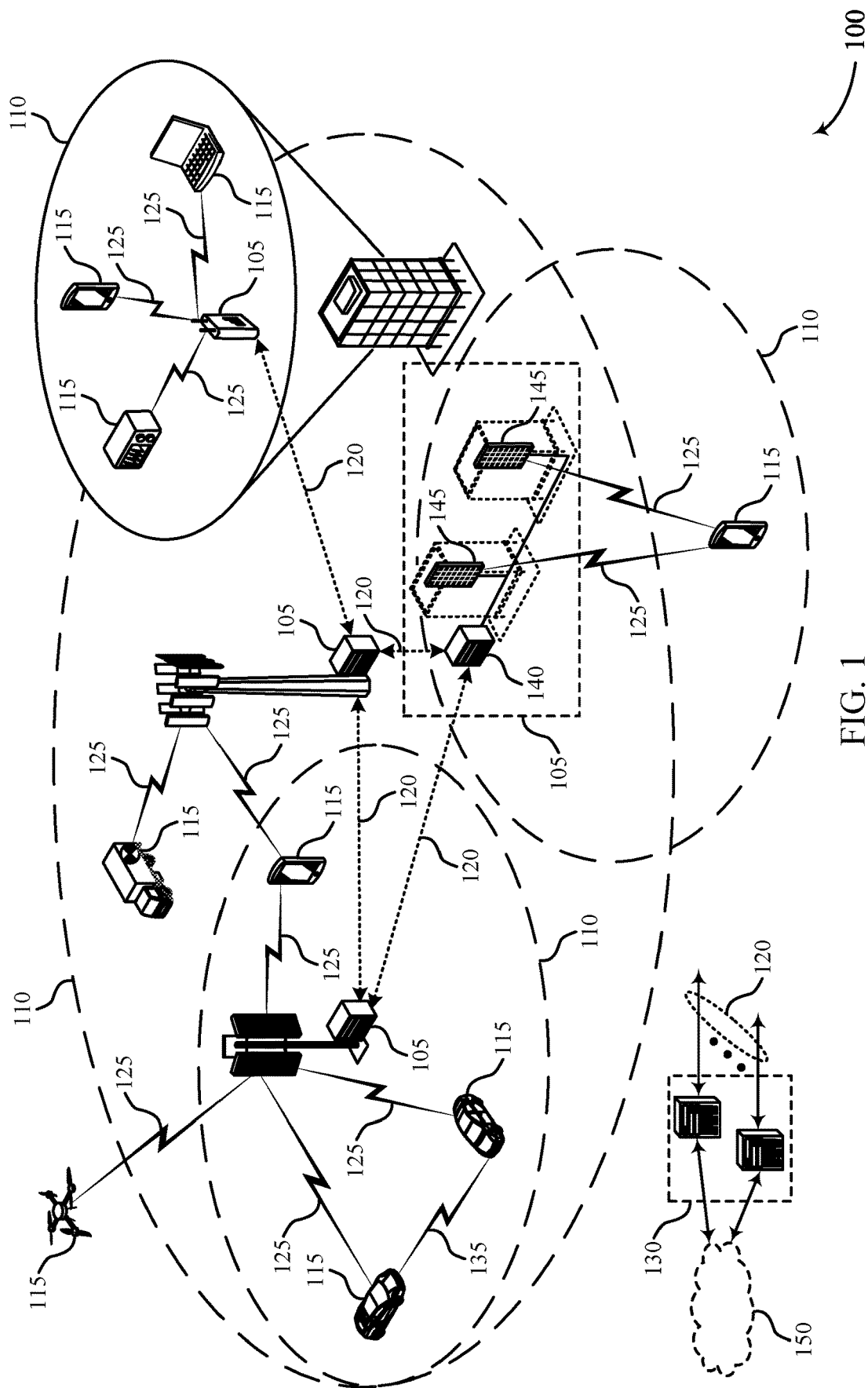
FIG. 1 illustrates an example of a wireless communications system that supports techniques for sidelink reference signal transmission in accordance with various aspects of the present disclosure.

In some wireless communications systems, user equipments (UEs) may exchange positioning reference signals (PRSs) using a sidelink channel in an unlicensed radio frequency spectrum band. A first UE (e.g., an initiator UE) may perform a listen before talk (LBT) associated with the sidelink channel and may use the sidelink channel to transmit (e.g., broadcast) a first PRS if the LBT is successful (e.g., if an energy level of the sidelink channel is below a threshold). In response to detecting the first PRS, a second UE (e.g., a responder UE) may use the sidelink channel to transmit a second PRS.

In some cases, however, there may be a processing delay between when the second UE detects the first PRS and when the second UE begins transmitting the second PRS. Based on the delay, there may be a gap between the first PRS transmission and the second PRS transmission. If, for example, another device senses that the sidelink channel is idle (e.g., unoccupied) during the gap and begins transmitting on the sidelink channel before the second UE begins transmitting the second PRS, transmissions from the device may interfere with (e.g., interrupt) the second PRS transmission.

To ensure that other devices do not begin transmitting on the sidelink channel before the second UE begins transmitting the second PRS, the first UE may transmit the first PRS for a duration that is based on the processing delay of the second UE. For example, the first UE may transmit the first PRS for a duration that is longer than the processing delay associated with the second UE detecting the first PRS and preparing to transmit the second PRS. Transmitting the first PRS with a duration that is longer than the processing delay may improve the likelihood of the second UE successfully accessing the sidelink channel (e.g., for transmission of the second PRS). As a result, the second UE may transmit the second PRS with reduced latency and improved efficiency, among other benefits.

In some examples, the duration of the first PRS may be based on a processing capability of the second UE, a processing time of the second UE, or both. For example, the second UE may transmit a capability report to the first UE and the first UE may determine the duration of the first PRS based on receiving the capability report. In other examples, the duration of the first PRS may be preconfigured (e.g., via radio resource control (RRC) signaling) or dynamically indicated (e.g., via a medium access control (MAC) control element (MAC-CE) or a downlink control information (DCI) message). For example, the first UE may receive a broadcast message (e.g., a system information block (SIB)) from a base station that indicates the duration of the first PRS.

Various aspects of the present disclosure may enable UEs to exchange sidelink PRSs in a shared radio frequency spectrum band with improved reliability, greater efficiency, and reduced latency, among other benefits. For example, aspects of the present disclosure may enable UEs to exchange PRSs with reduced interference from other devices operating in the shared radio frequency spectrum band. As a result, the UEs may obtain more accurate sidelink positioning information and may communicate with improved reliability. Additionally, aspects of the present disclosure may enable a responder UE to transmit (e.g., broadcast) a PRS in a shared channel occupancy (e.g., based on performing an LBT without a random back-off). As such, the responder UE may have a higher likelihood of successfully accessing the shared channel and transmitting the PRS, which may result in reduced latency and improved battery life at the responder UE.

Aspects of the present disclosure are initially described in the context of wireless communications systems, communication schedules, and a process flow. Aspects of the present disclosure are further illustrated by and described with reference to apparatus diagrams, system diagrams, and flowcharts that relate to techniques for sidelink reference signal transmission.

FIG. 1 illustrates an example of a wireless communications system 100 that supports techniques for sidelink reference signal transmission in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The quantity of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame quantity (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the quantity of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a quantity of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a quantity of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more radio frequency spectrum bands in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the radio frequency spectrum band below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed radio frequency spectrum bands may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a quantity of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at specific orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a specific orientation (e.g., with respect to the antenna array of the transmitting device or receiving device, or with respect to some other orientation).

In some wireless communications systems, such as a V2X communications system, a first UE 115 may communicate with a second UE 115 using a sidelink connection (e.g., a sidelink channel). The sidelink connection may be associated with a radio frequency spectrum band, such as a cellular radio frequency spectrum band (e.g., a sidelink channel sharing spectrum in a licensed cellular radio frequency spectrum band) or a dedicated intelligent transportation system (ITS) radio frequency spectrum band.

In some cases, the first UE 115 and the second UE 115 may use the sidelink connection to perform a sidelink positioning procedure (e.g., for V2X, public safety, or commercial use cases). The sidelink positioning procedure may enable the first UE 115 and the second UE 115 to obtain positioning information based on measuring one or more sidelink PRSs. For example, the first UE 115 may transmit a sidelink PRS and the second UE 115 may perform a set of measurements based on detecting the sidelink PRS. The set of measurements may include a time of arrival (ToA), a time delay of arrival (TDoA), an angle of arrival (AoA), a round trip time (RTT), or a combination thereof. The second UE 115 may determine positioning information for the first UE 115 (and vice versa) based on the set of measurements.

Accuracy of the positioning information may depend on a bandwidth associated with the sidelink PRS. For example, a larger bandwidth may correspond to a higher accuracy. As a result, some high-accuracy sidelink positioning applications (e.g., V2X applications) may use a relatively large sidelink PRS bandwidth (e.g., 100 MHz or higher) to obtain more accurate positioning information (e.g., sub-meter level). However, some radio frequency spectrum bands (e.g., licensed radio frequency spectrum bands or ITS radio frequency spectrum bands) may not support such large PRS bandwidths.

In some cases, to reduce usage of limited bandwidth availability in licensed radio frequency spectrum bands, the first UE 115 and the second UE 115 may transmit sidelink PRSs in an unlicensed radio frequency spectrum band (e.g., an Unlicensed National Information Infrastructure (U-NII) 3 or U-NII 5 radio frequency spectrum band), which may have relatively large bandwidths available. However, the unlicensed radio frequency spectrum band may be shared with other technologies (e.g., wireless local area network (WLAN) systems, such as Wi-Fi). Additionally, access to the unlicensed radio frequency spectrum band may be regulated. For example, devices operating in the unlicensed radio frequency spectrum band may perform channel sensing (e.g., an LBT) prior to transmitting in the unlicensed radio frequency spectrum band.

When performing an LBT, a device (e.g., the first UE 115) may measure an energy level of the unlicensed radio frequency spectrum band and may transmit if the measured energy level is below a threshold. In some cases, different devices operating in the unlicensed radio frequency spectrum band may perform different types of LBTs. For example, some devices may perform a category one (CAT 1) LBT, which may include performing an LBT without energy sensing. That is, a CAT 1 LBT device may transmit immediately (e.g., similar to a Type 2c channel access procedure in unlicensed radio frequency spectrum bands). Other devices may perform a category two (CAT 2) LBT, which may include performing an LBT without a random back-off. That is, a CAT 2 LBT device may transmit if the measured energy level is below a threshold during a time period (e.g., similar to a Type 2a or Type 2b channel access procedure). Other devices may perform a category four (CAT 4) LBT, which may include performing an LBT with a random back-off and a contention window of a variable size. That is, a CAT 4 LBT device may transmit if the measured energy level is below a threshold during the contention window (e.g., similar to a Type 1 channel access procedure). CAT 1 LBTs and CAT 2 LBTs may not be supported in some scenarios.

In some cases, the first UE 115 and the second UE 115 may form a group to transmit PRSs in a channel occupancy time (COT) sharing manner (e.g., for shared channel access). Forming a group for PRS transmissions may improve the likelihood of the second UE 115 successfully accessing a shared channel in the unlicensed radio frequency spectrum band. For example, transmitting PRSs in a shared COT sharing manner may enable the second UE 115 to transmit a PRS based on performing a CAT 1 LBT or a CAT 2 LBT (e.g., an LBT without a random back-off) rather than a CAT 4 LBT (e.g., an LBT with a random back-off). As a result, the second UE 115 may transmit the PRS with reduced latency and improved reliability, among other benefits.

In some cases, the first UE 115 may perform an RTT-based sidelink positioning procedure with the second UE 115. For example, the first UE 115 may transmit a first PRS (e.g., an initiator PRS) to the second UE 115 and the second UE 115 may transmit a second PRS (e.g., a responder PRS) to the first UE 115 based on detecting the first PRS. The range between the first UE 115 and the second UE 115 may be calculated based on an RTT of the first PRS and the second PRS. In other words, the first UE 115 may calculate the range based on a first time at which the first UE 115 begins transmitting the first PRS and a second time at which the first UE 115 detects the second PRS.

In some cases, multiple UEs 115 may perform a group sidelink positioning procedure. For example, a roadside unit (RSU) may exchange PRSs with multiple UEs 115. In such cases, the RSU may transmit an initiator PRS and each of the multiple UEs 115 may transmit a responder PRS to the RSU (e.g., based on detecting the initiator PRS) in accordance with a transmission order. For example, if the RSU transmits the initiator PRS, the first UE 115 may transmit a first responder PRS to the RSU based on detecting the initiator PRS and the second UE 115 may transmit a second responder PRS to the RSU based on detecting the initiator PRS from the RSU or the first responder PRS from the first UE 115.

In some cases, if the first UE 115 attempts to transmit a sidelink PRS using the unlicensed radio frequency spectrum band, a transmission opportunity (e.g., a time resource location) for the sidelink PRS may be variable. That is, the first UE 115 may be unable to transmit the sidelink PRS without first performing a successful LBT. As a result, the second UE 115 may be unable to determine when the sidelink PRS will arrive at the second UE 115.

In some cases, to reduce variability associated with transmitting sidelink PRSs in the unlicensed radio frequency spectrum band, the first UE 115 and the second UE 115 may exchange PRSs during a shared channel occupancy (CO), which may be referred to as a shared COT. For example, the first UE 115 may perform a channel access procedure (e.g., an LBT) in accordance with an LBT type (e.g., a CAT 4 LBT or a Type 1 channel access procedure). If the LBT is successful, the first UE 115 may initiate a COT in the unlicensed radio frequency spectrum band (e.g., based on transmitting an initiator PRS). During the COT of the first UE 115, other devices operating in the unlicensed radio frequency spectrum band may refrain from transmitting signals that may interfere with the first UE 115. In some cases, the COT may be initiated based on the first UE 115 transmitting an initiator PRS. In other cases, the COT may be initiated based on the first UE 115 transmitting a control signal and a subsequent initiator PRS transmission. In response to detecting the initiator PRS, the second UE 115 may transmit a responder PRS during the COT initiated by first UE 115. In some examples, the second UE 115 may transmit the responder PRS based on performing a CAT 1 LBT or a CAT 2 LBT (e.g., without a random back-off), which may improve the likelihood of the second UE 115 successfully transmitting the responder PRS during the COT. That is, transmitting the responder PRS based on performing an LBT without a random back-off may improve the likelihood of the second UE 115 successfully accessing the unlicensed radio frequency spectrum band (e.g., for transmission of the responder PRS).

In some cases, if a gap between the initiator PRS and the responder PRS is less than a threshold (e.g., 25 microseconds (μs)), the second UE 115 may transmit the responder PRS based on performing a CAT 1 LBT or a CAT 2 LBT. That is, the second UE 115 may refrain from performing a CAT 4 LBT (e.g., with a random back-off) prior to transmitting the responder PRS. As such, the second UE 115 may avoid delays associated with performing a random back-off, which may improve the likelihood of the second UE 115 successfully accessing the unlicensed radio frequency spectrum band.

A UE 115 initiating a COT in an unlicensed radio frequency spectrum band may be referred to as an initiator. A UE 115 sharing the COT of the initiator may be referred to as a responder. In some sidelink positioning procedures, there may be one initiator and one or more responders, as described with reference to FIGS. 4A and 4B.

Figure 2:
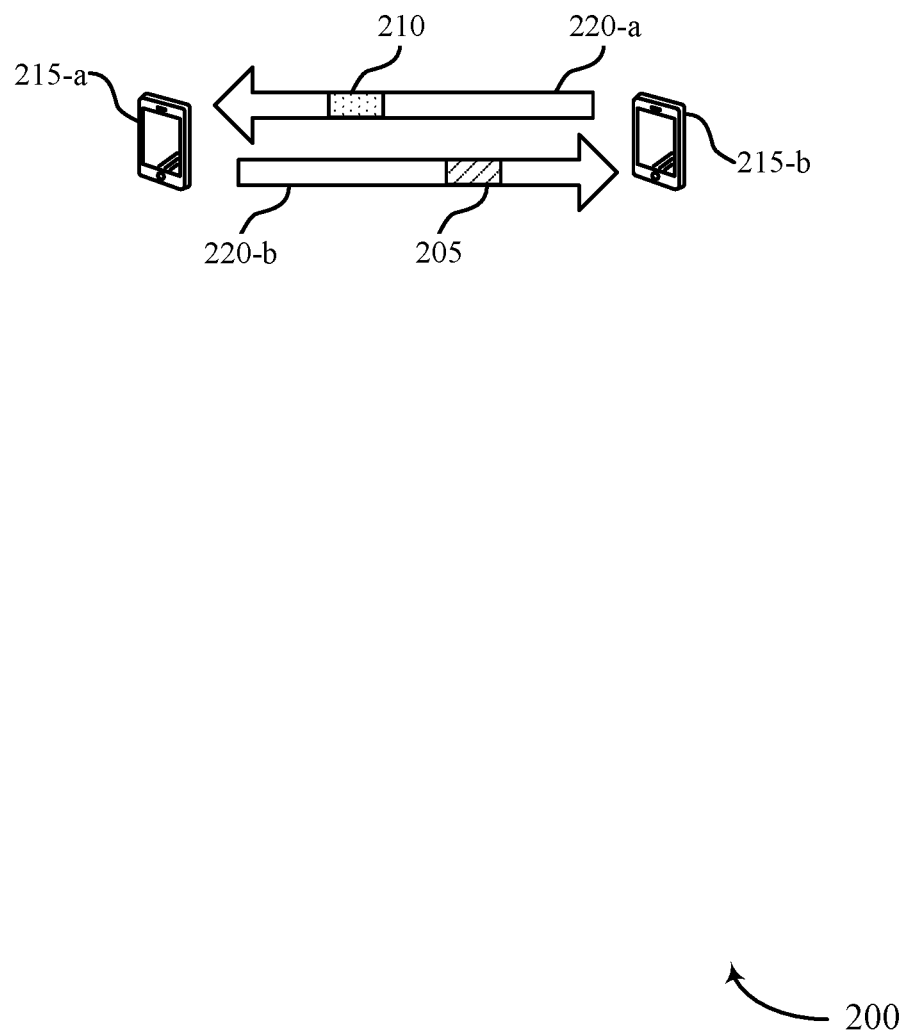
FIG. 2 illustrates an example of a wireless communications system that supports techniques for sidelink reference signal transmission in accordance with various aspects of the present disclosure.

FIG. 2 illustrates an example of a wireless communications system 200 that supports techniques for sidelink reference signal transmission in accordance with various aspects of the present disclosure. The wireless communications system 200 may implement or be implemented by aspects of the wireless communications system 100. For example, the wireless communications system 200 may include a UE 215-*a* and a UE 215-*b*, which may be examples of UEs 115 described with reference to FIG. 1.

In the wireless communications system 200, the UE 215-*a* and the UE 215-*b* may exchange PRSs in an unlicensed (e.g., shared) radio frequency spectrum band. For example, the UE 215-*a* (e.g., the initiator UE) may transmit an initiator PRS 205 using a communication link 220-*b*. In response to detecting the initiator PRS 205, the UE 215-*b* may transmit a responder PRS 210 using a communication link 220-*a*. In some cases, the UE 215-*a* may transmit a message to the UE 215-*b* that indicates a time at which the UE 215-*a* intends to begin transmitting the initiator PRS 205. As such, the UE 215-*b* may expect to receive the initiator PRS 205 at the indicated time.

In some cases, however, the UE 215-*a* may perform an LBT associated with the communication link 220-*b* prior to transmitting the initiator PRS 205. If the LBT is unsuccessful (e.g., if an energy level of the communication link 220-*b* is above a threshold), the UE 215-*a* may delay transmission of the initiator PRS 205. If the UE 215-*a* is unable to transmit the initiator PRS 205 at the indicated time (e.g., because the communication link 220-*b* is occupied by other devices), the UE 215-*a* may perform additional channel sensing (e.g., additional LBTs) on the communication link 220-*b* and may transmit the initiator PRS 205 at a second time when the communication link 220-*b* is clear (e.g., in response to a successful LBT).

In such cases, the UE 215-*b* may be unable to determine the second time at which the UE 215-*a* begins transmitting the initiator PRS 205. As such, the UE 215-*b* may continuously (e.g., blindly) monitor the communication link 220-*b* for the initiator PRS 205. In response to detecting the initiator PRS 205, the UE 215-*b* may transmit the responder PRS 210 using the communication link 220-*a*.

In some cases, however, there may be a processing delay between when the UE 215-*b* detects the initiator PRS 205 and when the UE 215-*b* begins transmitting the responder PRS 210. As a result, there may be a gap between the initiator PRS 205 and the responder PRS 210. If, for example, another device (not shown) operating in the unlicensed radio frequency spectrum band senses that the communication links 220 are idle and begins transmitting on the communication links 220 prior to the UE 215-*b* transmitting the responder PRS 210, transmissions from the device may interfere with the responder PRS 210.

In accordance with various aspects of the present disclosure, the wireless communications system 200 may provide for determining a duration of the initiator PRS 205 based on the processing delay at the UE 215-*b*. In some examples, the UE 215-*a* may determine a first time resource (e.g., a first time location) for transmission of the initiator PRS 205. The first time resource may be based on a result (e.g., an outcome) of an LBT. For example, if the UE 215-*a* intends to transmit the initiator PRS 205 at a first time (e.g., t1) but fails to perform a successful LBT prior to the first time, the UE 215-*a* may delay transmission of the initiator PRS 205 by a first delay period (e.g., t_delta1). As such, the determined first time resource may correspond to a second time (e.g., t1+t_delta1). After determining the first time resource, the UE 215-*a* may determine a second time resource (e.g., time location) for the UE 215-*b* to use when transmitting the responder PRS 210. The second time resource may be based on the first time (e.g., t1), the first delay period (e.g., t_delta1), and the duration of the initiator PRS 205 (e.g., t_delta2). Accordingly, the UE 215-*a* may transmit the initiator PRS 205 using the first time resource and may monitor for the responder PRS 210 using the second time resource.

In some examples, the UE 215-*b* may determine the duration of the initiator PRS 205 prior to receiving the initiator PRS 205 (e.g., based on a configuration or an indication from the UE 215-*a*). Starting from the first time (e.g., t1), the UE 215-*b* may monitor the communication link 220-*b* for the initiator PRS 205. The UE 215-*b* may determine the second time resource (e.g., for transmission of the responder PRS 210) based on the determined duration of the initiator PRS 205 and a third time at which the UE 215-*b* detects the initiator PRS 205. Accordingly, the UE 215-*b* may transmit the responder PRS 210 using the second time resource.

In some examples, the duration of the initiator PRS 205 may be based on a processing capability of the UE 215-*b* or a processing time of the UE 215-*b*, as described with reference to FIG. 3. This may enable the UE 215-*a* and the UE 215-*b* to transmit PRSs (e.g., the initiator PRS 205 and the responder PRS 210) in a shared COT, as described with reference to FIG. 1. For example, the UE 215-*a* may initiate a COT associated with the unlicensed radio frequency spectrum band (e.g., based on transmitting the initiator PRS 205 or a control signal) and may transmit the initiator PRS 205 during the COT. In response to detecting the initiator PRS 205, the UE 215-*b* may transmit the responder PRS 210 during the same COT (e.g., without performing a CAT 4 LBT). In other words, if COT sharing is enabled, the UE 215-*b* may perform a CAT 1 LBT or a CAT 2 LBT (e.g., rather than a CAT 4 LBT) prior to transmitting the responder PRS 210. As a result, the UE 215-*b* may experience a reduced channel access time associated with transmission of the responder PRS 210, which may reduce sidelink positioning delays associated with exchanging PRSs in the unlicensed radio frequency spectrum band.

Figure 3:
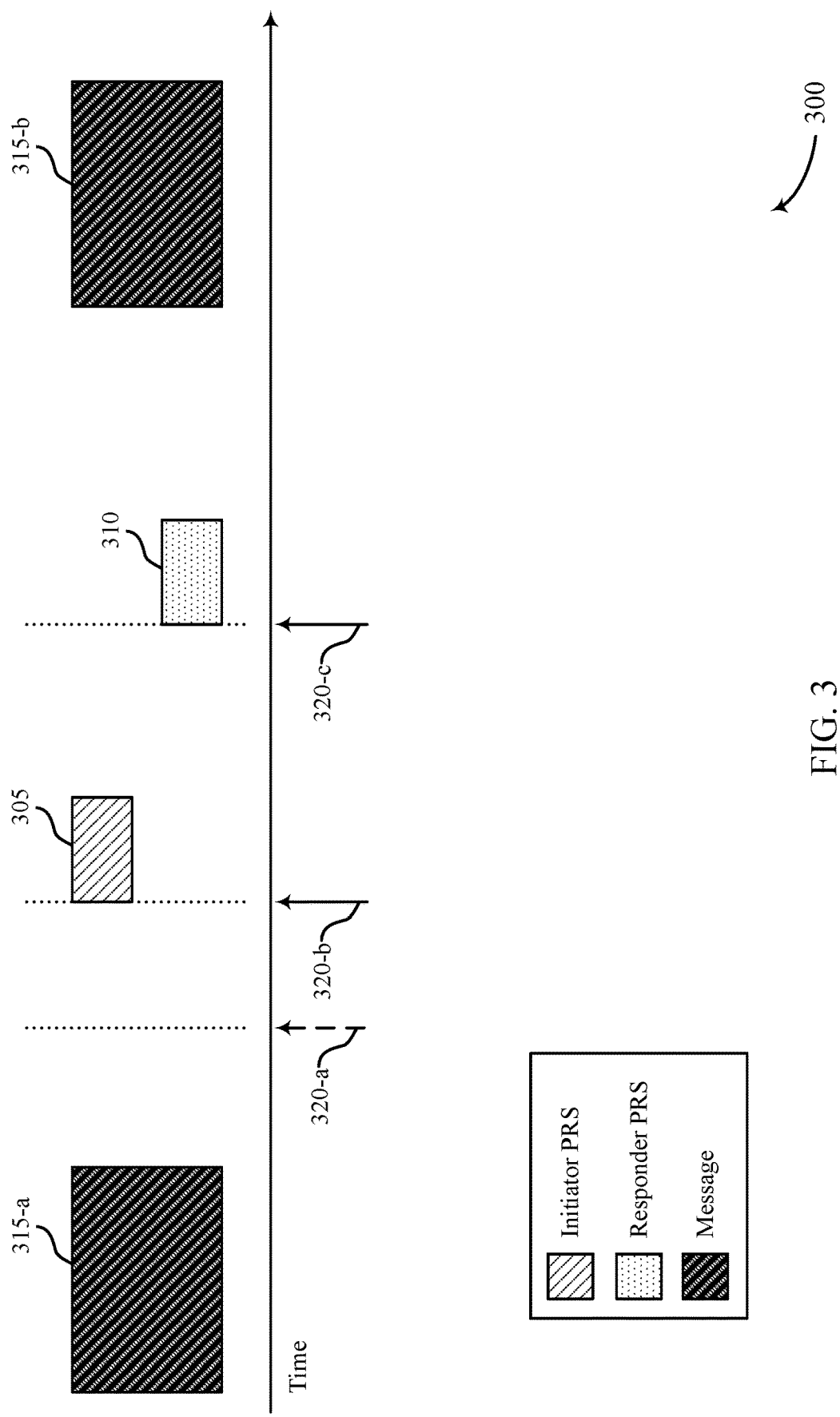
FIG. 3 illustrates an example of a communication schedule that supports techniques for sidelink reference signal transmission in accordance with various aspects of the present disclosure.

FIG. 3 illustrates an example of a communication schedule 300 that supports techniques for sidelink reference signal transmission in accordance with various aspects of the present disclosure. The communication schedule 300 may implement or be implemented by aspects of the wireless communications system 100 or the wireless communications system 200. For example, the communication schedule 300 may be implemented by an initiator UE and a responder UE, which may be examples of a UE 115 or a UE 215 as described with reference to FIGS. 1 and 2. The communication schedule 300 may include an initiator PRS 305 and a responder PRS 310, which may be examples of an initiator PRS 205 and a responder PRS 210 as described with reference to FIG. 2.

In some examples, the initiator UE and the responder UE may communicate using a sidelink channel in an unlicensed radio frequency spectrum band. For example, the initiator UE and the responder UE may use the sidelink channel to exchange one or more messages 315-*a*. In some examples, the one or more messages 315-*a* may include capability information (e.g., a processing time, a processing capability, or both) associated with the responder UE. That is, the responder UE may explicitly or implicitly report the capability information to the initiator UE. In some examples, the responder UE may report the capability information to the initiator UE during a handshake procedure between the initiator UE and the responder UE.

The capability information may be mapped to a quantity of symbols (e.g., OFDM symbols) associated with the initiator PRS 305. In some examples, the quantity of symbols may also be associated with a numerology or a subcarrier spacing (SCS) of the responder UE. For example, a relatively larger SCS may map to a relatively higher quantity of symbols. In other examples, the one or more messages 315-*a* may include a parameter that indicates the quantity of symbols associated with the initiator PRS 305. Alternatively, the one or more messages 315-*a* may include a parameter that indicates a time associated with the initiator PRS 305. For example, the responder UE may transmit a parameter to the initiator UE that indicates an absolute time duration or a quantity of samples associated with the initiator PRS 305.

The one or more messages 315-*a* (e.g., a pre-PRS message exchange) may implicitly or explicitly indicate a duration for the initiator PRS 305. For example, the responder UE may explicitly indicate a processing time associated with detecting the initiator PRS 305 and preparing to transmit a responder PRS 310. In such examples, the initiator UE may determine the duration for the initiator PRS 305 such that the duration is greater than the indicated processing time of the responder UE. In other examples, the responder UE may explicitly indicate a requested (e.g., desired) duration for the initiator PRS 305. The requested duration may include an absolute time, a quantity of samples, a quantity of symbols (e.g., OFDM symbols), or a quantity of PRSs (e.g., one PRS may include one or more OFDM symbols).

In other examples, the responder UE may transmit a capability report to the initiator UE and the initiator UE may determine a duration for the initiator PRS 305 based on the capability report. That is, different UE capabilities may correspond to different processing times. For example, the responder UE may be associated with a specific UE capability category that corresponds to a specific PRS processing time. In some examples, greater UE capabilities may correspond to shorter PRS processing times. The initiator UE may determine a quantity of symbols in which to transmit the initiator PRS 305 based on determining the PRS processing time of the responder UE. In such examples, the quantity of symbols may be greater than the determined PRS processing time.

Additionally or alternatively, the one or more messages 315-*a* may indicate a duration of a gap period to be included between the initiator PRS 305 and the responder PRS 310. In some examples, the initiator UE or the responder UE may indicate the duration for the gap period during a handshake procedure between the initiator UE and the responder UE. For example, the initiator UE may transmit signaling to the responder UE that indicates whether the duration of the gap period corresponds to a first length (e.g., 16 µs) or a second length (e.g., 25 µs). Alternatively, the duration for the gap period may be predefined or preconfigured. For example, the initiator UE may configure the gap period with a predefined length (e.g., 16 µs).

In some examples, the one or more messages 315-*a* may also include an indication of a first time 320-*a* at which the initiator UE intends to transmit the initiator PRS 305. In some cases, however, the initiator UE may fail to perform a successful LBT prior to the first time 320-*a*. That is, the initiator UE may determine that another device is occupying the sidelink channel at the first time 320-*a*. As such, the initiator UE may delay transmission of the initiator PRS 305 until the sidelink channel is clear (e.g., until an energy level of the sidelink channel is below a threshold). In response to determining that the sidelink channel is clear (e.g., in response to a successful LBT), the initiator UE may begin transmitting the initiator PRS 305 at a second time 320-*b*.

As described herein, the duration of the initiator PRS 305 may be based on the one or more messages 315-*a*. For example, the duration of the initiator PRS 305 (e.g., a quantity of symbols) may be based on a processing capability of the responder UE, a processing time of the responder UE, a requested duration for the initiator PRS 305, or a combination thereof indicated in the one or more messages 315-*a*. Additionally or alternatively, the duration of the initiator PRS 305 may be based on a numerology or an SCS associated with the responder UE.

Starting at the first time 320-*a*, the responder UE may begin monitoring the sidelink channel for the initiator PRS 305. In response to detecting the initiator PRS 305, the responder UE may begin transmitting the responder PRS 310 at a third time 320-*c*. In some examples, the initiator UE may configure a gap period between the initiator PRS 305 and the responder PRS 310. The duration of the gap period may be preconfigured or indicated in the one or more messages 315-*a*.

In some examples, the responder UE may generate a set of measurements based on receiving the initiator PRS. The set of measurements may include an RTT, a ToA, a TDoA, an AoA, or a combination thereof associated with the initiator PRS. The initiator UE may generate a similar set of measurements based on receiving the responder PRS. In some examples, the initiator UE and the responder UE may exchange measurements via one or more messages 315-*b* (e.g., a post-PRS message exchange). Accordingly, the initiator UE may determine sidelink positioning information for the responder UE (and vice versa) based on the one or more messages 315-*b*.

The communication schedule 300 may enable the initiator UE and the responder UE to exchange PRSs (e.g., the initiator PRS 305 and the responder PRS 310) within a shared COT, as described with reference to FIG. 1. For example, the initiator UE may initiate a COT (e.g., in the unlicensed radio frequency spectrum band) based on performing a successful LBT and may transmit the initiator PRS 305 during the COT. In response to detecting the initiator PRS 305, the responder UE may transmit the responder PRS 310 during the same COT (e.g., without performing a CAT 4 LBT), which may result in reduced latency, lower processing costs, decreased power consumption, and improved sidelink reporting at the responder UE.

FIGS. 4A and 4B illustrate examples of communication schedules 400 that support techniques for sidelink reference signal transmission in accordance with various aspects of the present disclosure. The communication schedules 400 may implement or be implemented by aspects of the wireless communications system 100 or the wireless communications system 200. For example, the communication schedules 400 may be implemented by an initiator UE and a responder UE, which may be examples of a UE 115 or a UE 215 as described with reference to FIGS. 1 and 2. The communication schedules 400 may include initiator PRSs 405, which may be examples of an initiator PRS 205 or an initiator PRS 305 as described with reference to FIGS. 2 and 3. Likewise, the communication schedules 400 may include responder PRSs 410, which may be examples of a responder PRS 210 or a responder PRS 310 as described with reference to FIGS. 2 and 3.

In the communication schedule 400-a illustrated in FIG. 4A, an initiator UE may transmit an initiator PRS 405-a using a sidelink channel in an unlicensed radio frequency spectrum band. In some examples, a duration of the initiator PRS 405-a may be preconfigured at the initiator UE. In other examples, the initiator UE may receive broadcast signaling (e.g., a SIB) from a base station that indicates the duration of the initiator PRS 405-a. The duration of the initiator PRS 405-a may ensure that the responder UE is able to detect the initiator PRS 405-a (e.g., based on blindly monitoring the sidelink channel) and prepare to transmit a responder PRS 410-a.

In some examples, the duration of the initiator PRS 405-a may include a quantity of symbols (e.g., 2, 3, 4, 5, or 6 OFDM symbols). The quantity of symbols in the initiator PRS 405-a may be preconfigured at the initiator UE (e.g., for sidelink positioning) or indicated via broadcast signaling. As an example, the initiator UE may be preconfigured to transmit the initiator PRS 405-a for a duration of four symbols when performing a sidelink positioning procedure. Additionally or alternatively, the initiator UE may be preconfigured to include a gap period between the initiator PRS 405-a and the responder PRS 410-a.

The responder UE may use the sidelink channel to transmit the responder PRS 410-a based on detecting the initiator PRS 405-a. In some examples, the initiator UE may configure a gap period between the initiator PRS 405-a and the responder PRS 410-a. In some examples, there may be a processing delay between when the responder UE detects the initiator PRS 405-a and when the responder UE begins transmitting the responder PRS 410-a.

As an example, the initiator UE may begin transmitting the initiator PRS 405-a in a first symbol, and may continue transmitting the initiator PRS 405-a in a second symbol, a third symbol, and a fourth symbol. The responder UE may be able to detect the initiator PRS 405-a in the first symbol or the second symbol, but may not finish detecting the initiator PRS 405-a until the third symbol or the fourth symbol. Upon completing detection of the initiator PRS 405-a, the responder UE may begin preparing to transmit the responder PRS 410-a. Thus, even though the responder UE may detect the initiator PRS 405-a in the first symbol or the second symbol, the responder UE may be unable to begin transmitting the responder PRS 410-a immediately (e.g., due to the processing delay).

In some examples, to enable COT sharing in the unlicensed radio frequency spectrum band, the initiator UE may continue transmitting the initiator PRS 405-a such that a gap between the initiator PRS 405-a and the responder PRS 410-a is below a threshold (e.g., to occupy the sidelink channel). After the initiator UE finishes transmitting the initiator PRS 405-a, the responder UE may transmit the responder PRS 410-a in a COT sharing manner (e.g., based on the initiator UE performing a successful CAT 4 LBT). That is, both the initiator PRS 405-a and the responder PRS 410-a may be transmitted (e.g., by the initiator UE and the responder UE, respectively) in a shared COT 420-a. In such examples, the duration of the initiator PRS 405-a may be longer than a duration of the responder PRS 410-a.

In the communication schedule 400-b illustrated in FIG. 4B, an initiator UE may transmit an initiator PRS 405-b, which may be detected by a first responder UE, a second responder UE, a third responder UE, or a combination thereof. Although the communication schedule 400-b is illustrated with three responder UEs, it is to be understood that the initiator PRS 405-b may be detected by any quantity of responder UEs. The initiator UE and the responder UEs may exchange PRSs in an unlicensed radio frequency spectrum band as part of a group sidelink positioning procedure. In some examples, the initiator UE may be an RSU that initiates the group sidelink positioning procedure based on transmitting the initiator PRS 405-b.

In some examples, a duration of the initiator PRS 405-b may be based on a highest processing time associated with the responder UEs. For example, each of the responder UEs may report a processing time to the initiator UE, and the initiator UE may determine the duration of the initiator PRS 405-b based on identifying the highest reported processing time. In some examples, the responder UEs may be associated with different processing times. That is, some of the responder UEs may be associated with relatively higher processing times and other responder UEs may be associated with relatively lower processing times. The initiator UE may determine the duration of the initiator PRS 405-b such that the duration is longer than the highest reported processing time.

In other examples, the initiator UE may determine a transmission order for the responder UEs. For example, the initiator UE may configure the second responder UE to transmit after the first responder UE and may configure the third responder UE to transmit after the second responder UE. In such examples, the duration of the initiator PRS 405-b may be based on a processing time of the first responder UE in the transmission order because the first responder UE may have less time (e.g., compared to subsequent UEs in the transmission order) to detect the initiator PRS 405-b and prepare to transmit a first responder PRS 410-b.

In some examples, the initiator UE and the responder UEs may exchange PRSs during a shared COT 420-b. In such examples, the initiator UE may indicate (e.g., to the responder UEs) time resources in the shared COT 420-b for the responder UEs to use when transmitting the responder PRSs 410. Alternatively, the responder UEs may determine the time resources based on detecting the initiator PRS 405-b from the initiator UE.

In response to detecting the initiator PRS 405-b, the first responder UE may transmit a first responder PRS 410-b to the initiator UE. Likewise, the second responder UE may transmit a second responder PRS 410-c to the initiator UE based on detecting the first responder PRS 410-b or the initiator PRS 405-b. Similarly, the third responder UE may transmit a third responder PRS 410-d to the initiator UE based on detecting the second responder PRS 410-c, the first responder PRS 410-b, or the initiator PRS 405-b. In some examples, a time resource for each of the responder PRSs 410 may be predefined or preconfigured because the responder PRSs 410 may not be subject to delays (e.g., due to unsuccessful LBTs). That is, the initiator UE (and other responder UEs) may determine start times of the responder PRSs 410 without performing blind PRS detection.

In some examples, a duration of the responder PRSs 410 may include a predefined quantity of symbols (e.g., 2 OFDM symbols). In other examples, the duration of the responder PRSs 410 may be lower than an upper bound (e.g., 12 OFDM symbols) and higher than a lower bound (e.g., 2

OFDM symbols). Alternatively, durations of the responder PRSs 410 may be based on processing capabilities of the responder UEs and a transmission order. For example, a duration of the first responder PRS 410-*b* may be based on processing capabilities of the second responder UE. Likewise, a duration of the second responder PRS 410-*c* may be based on processing capabilities of the third responder UE.

In some examples, the initiator UE may determine a transmission order for the responder UEs, durations for the responder PRSs 410, or both based on the processing capabilities of the responder UEs. For example, the initiator UE may determine the transmission order to ensure that a responder UE with a longest processing time (e.g., a lowest processing capability) is able to detect the initiator PRS 405-*a* and prepare to transmit a responder PRS 410. In such examples, the initiator UE may transmit an indication of the transmission order, the durations for the responder PRSs 410, or both to the responder UEs.

The initiator UE may configure gap periods 415 between the initiator PRS 405-*b* and the responder PRSs 410. For example, the initiator UE may configure a gap period 415-*b* between the initiator PRS 405-*b* and the first responder PRS 410-*b*, a gap period 415-*c* between the first responder PRS 410-*b* and the second responder PRS 410-*c*, and a gap period 415-*d* between the second responder PRS 410-*c* and the third responder PRS 410-*d*. Thus, if the initiator UE begins transmitting the initiator PRS 405-*b* at a first time, the first responder UE may begin transmitting the first responder PRS 410-*b* at a second time that is based on the first time, the duration of the initiator PRS 405-*b*, and a duration of the gap period 415-*b*. Likewise, the second responder UE may begin transmitting the second responder PRS 410-*c* at a third time that is based on the second time, a duration of the second responder PRS 410-*c*, and a duration of the gap period 415-*c*. Similarly, the third responder UE may begin transmitting the third responder PRS 410-*d* at a fourth time that is based on the third time, a duration of the second responder PRS 410-*c*, and a duration of the gap period 415-*d*.

The communication schedule 400-*b* may enable the responder UEs to transmit the responder PRSs 410 to the initiator UE based on performing a CAT 1 LBT or a CAT 2 LBT (e.g., rather than a CAT 4 LBT), which may increase the likelihood of the responder UEs successfully accessing the unlicensed radio frequency spectrum band (e.g., for transmission of the PRSs 410). As a result, the responder UEs may transmit the responder PRSs 410 with reduced latency, which may enable the initiator UE and the responder UEs to determine more accurate sidelink positioning information.

Figure 5:
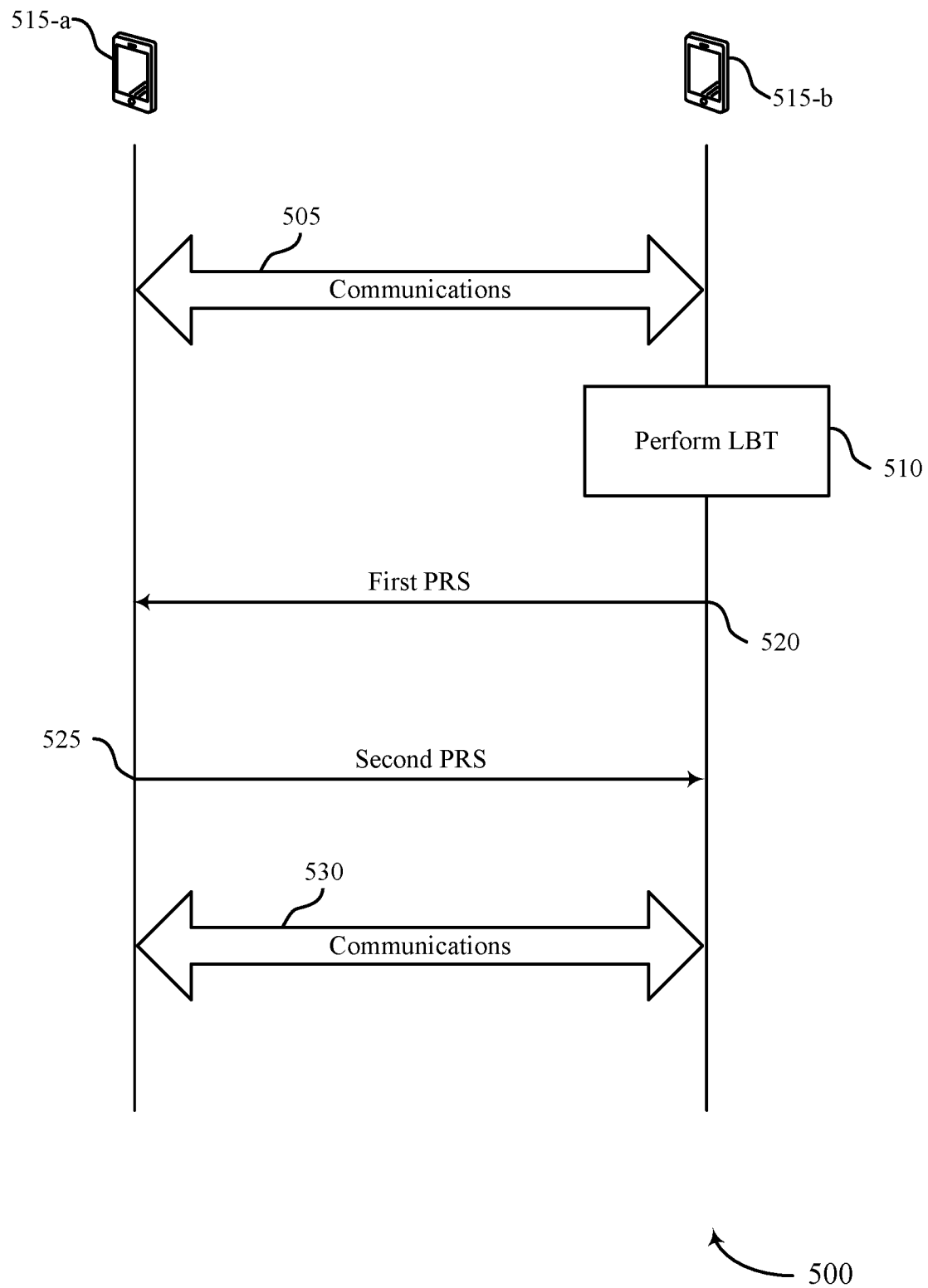
FIG. 5 illustrates an example of a process flow that supports techniques for sidelink reference signal transmission in accordance with various aspects of the present disclosure.

FIG. 5 illustrates an example of a process flow 500 that supports techniques for sidelink reference signal transmission in accordance with various aspects of the present disclosure. The process flow 500 may implement or be implemented by aspects of the wireless communications system 100 or the wireless communications system 200. For example, the process flow 500 may be implemented by a UE 515-*a* (e.g., a responder UE) and a UE 515-*b* (e.g., an initiator UE), which may be examples of a UE 115 or a UE 215 as described with reference to FIGS. 1 and 2. In the following description of the process flow 500, operations between the UE 515-*a* and the UE 515-*b* may be performed in a different order or at a different time than as shown. Additionally or alternatively, some operations may be omitted from the process flow 500, and other operations may be added to the process flow 500.

At 505, the UE 515-*a* and the UE 515-*b* may communicate using a sidelink channel (e.g., a sidelink connection) in an unlicensed radio frequency spectrum band. In some examples, the UE 515-*a* may transmit a capability report to the UE 515-*b* that indicates a processing time of the UE 515-*a*, a processing capability of the UE 515-*b*, or both. The UE 515-*a* may also transmit, to the UE 515-*b*, an indication of a requested duration for an initiator PRS (e.g., a first reference signal). The requested duration may include a quantity of symbols, a quantity of time samples, an absolute time duration, a quantity of PRSs, or a combination thereof. The UE 515-*b* may determine a duration for the initiator PRS based on the capability report, the requested duration, or both.

At 510, the UE 515-*b* may perform an LBT prior to transmitting an initiator PRS. In some examples, if the LBT is unsuccessful (e.g., if an energy level associated with the sidelink channel is above a threshold), the UE 515-*b* may delay transmission of the initiator PRS. For example, if the UE 515-*b* intends to transmit the initiator PRS at a first time and determines (e.g., based on the LBT) that the sidelink channel is occupied at the first time, the UE 515-*b* may delay transmission of the initiator PRS until a second time at which the UE 515-*b* determines that the sidelink channel is unoccupied (e.g., based on performing a successful LBT).

At 520, the UE 515-*b* may transmit the initiator PRS using a first time resource. In some examples, the UE 515-*b* may transmit the initiator PRS in response to performing a successful LBT. The UE 515-*b* may determine the duration of the initiator PRS based on receiving a capability report or a requested duration from the UE 515-*a* at 505. Alternatively, the duration of the initiator PRS may be preconfigured or indicated via broadcast signaling (e.g., from a base station). In some examples, the UE 515-*b* may initiate a COT based on transmitting the initiator PRS.

At 525, the UE 515-*a* may monitor the sidelink channel for the initiator PRS and may use the sidelink channel to transmit a responder PRS (e.g., a second reference signal) based on detecting the initiator PRS. More specifically, the UE 515-*a* may determine a second time resource to use for transmitting the responder PRS based on detecting the initiator PRS. In some examples, the UE 515-*a* may transmit the responder PRS during the COT initiated by the UE 515-*b* at 520. As such, the UE 515-*a* may transmit the responder PRS based on performing an LBT without a back-off (e.g., a CAT 1 LBT or a CAT 2 LBT), which may enable the UE 515-*a* to transmit the responder PRS with reduced latency and improved reliability, among other benefits.

At 530, the UE 515-*a* and the UE 515-*b* may exchange measurements associated with the initiator PRS and the responder PRS. For example, the UE 515-*a* may transmit, to the UE 515-*b*, an indication of an RTT, a ToA, a TDoA, an AoA, or a combination thereof associated with the initiator PRS. Similarly, the UE 515-*b* may transmit, to the UE 515-*a*, an indication of an RTT, a ToA, a TDoA, an AoA, or a combination thereof associated with the responder PRS. The UE 515-*b* may determine sidelink positioning information for the UE 515-*a* (and vice versa) based on the exchanged measurements. In some examples, transmitting the initiator PRS and the responder PRS in the same COT may enable the UE 515-*a* and the UE 515-*b* to obtain more accurate sidelink positioning information, among other benefits.

Figure 6:
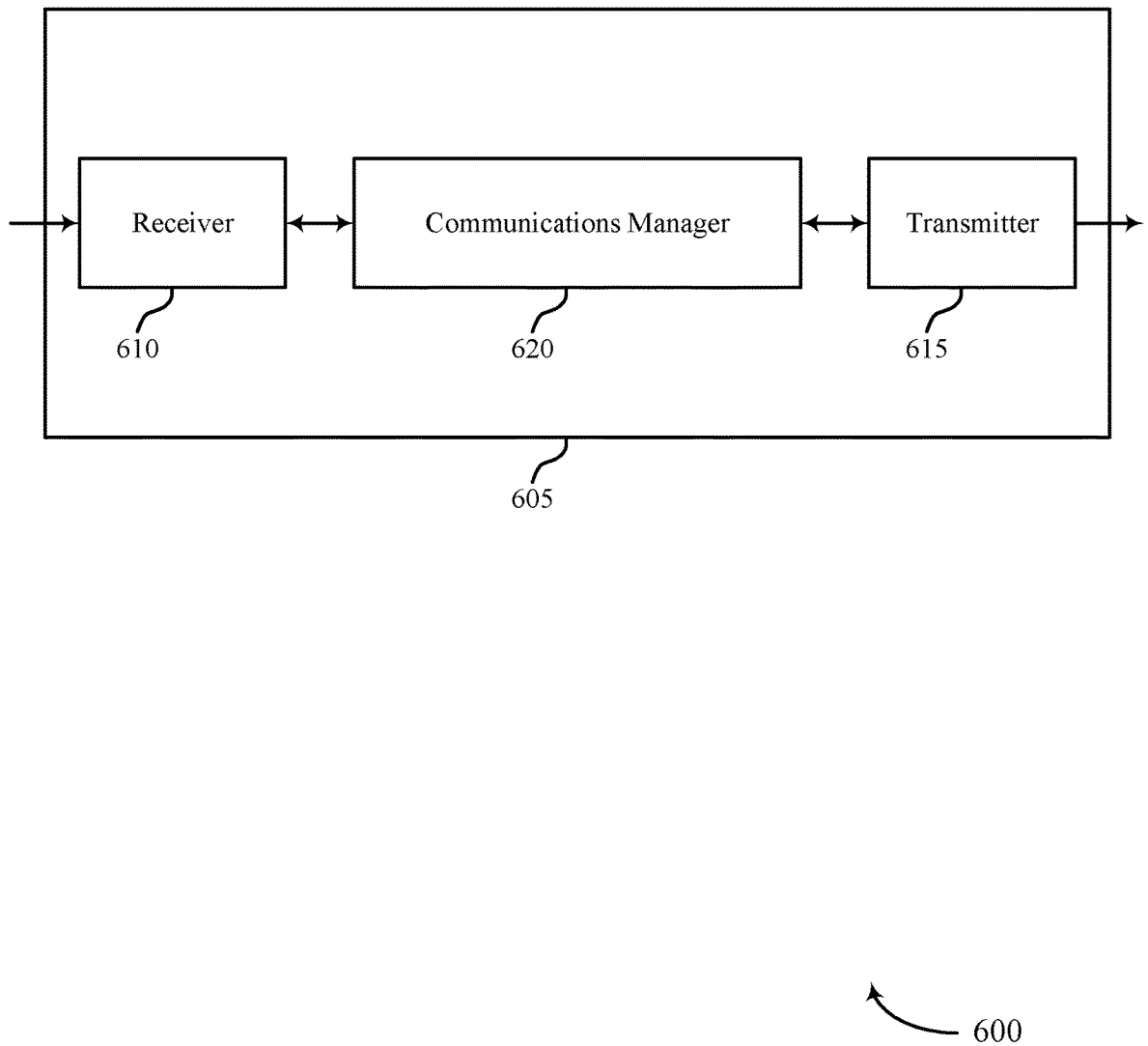
FIGS. 6 and 7 show block diagrams of devices that support techniques for sidelink reference signal transmission in accordance with various aspects of the present disclosure.

FIG. 6 shows a block diagram 600 of a device 605 that supports techniques for sidelink reference signal transmission in accordance with various aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for sidelink reference signal transmission). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for sidelink reference signal transmission). In some examples, the transmitter 615 may be co-located with a receiver 610 in a transceiver component. The transmitter 615 may utilize a single antenna or a set of multiple antennas.

The communications manager 620, the receiver 610, the transmitter 615, or various combinations thereof or various components thereof may be examples of means for performing various aspects of techniques for sidelink reference signal transmission as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE in accordance with examples as disclosed herein. For example, the communications manager 620 may be configured as or otherwise support a means for performing an LBT associated with a sidelink reference signal transmission using a shared radio frequency spectrum band, the sidelink reference signal transmission associated with sidelink positioning for the first UE, a second UE, or both. The communications manager 620 may be configured as or otherwise support a means for transmitting a first reference signal to the second UE using a first time resource, the first time resource based on a result of the performed LBT and a duration of the first reference signal. The communications manager 620 may be configured as or otherwise support a means for monitoring for a second reference signal from the second UE using a second time resource, the second time resource based on the duration of the first reference signal.

Additionally or alternatively, the communications manager 620 may support wireless communications at a first UE in accordance with examples as disclosed herein. For example, the communications manager 620 may be configured as or otherwise support a means for communicating with a second UE using a shared radio frequency spectrum band. The communications manager 620 may be configured as or otherwise support a means for receiving a first reference signal from the second UE using a first time resource. The communications manager 620 may be configured as or otherwise support a means for transmitting a second reference signal to the second UE using a second time resource, the second time resource based on a duration of the received first reference signal.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for more efficient utilization of communication resources based on exchanging PRSs within a shared COT. Exchanging the PRSs within the shared COT may reduce a quantity of LBTs performed by the device 605. As a result, the device 605 may consume less power, allocate fewer processing resources to performing LBTs, and spend more time in a sleep mode.

Figure 7:
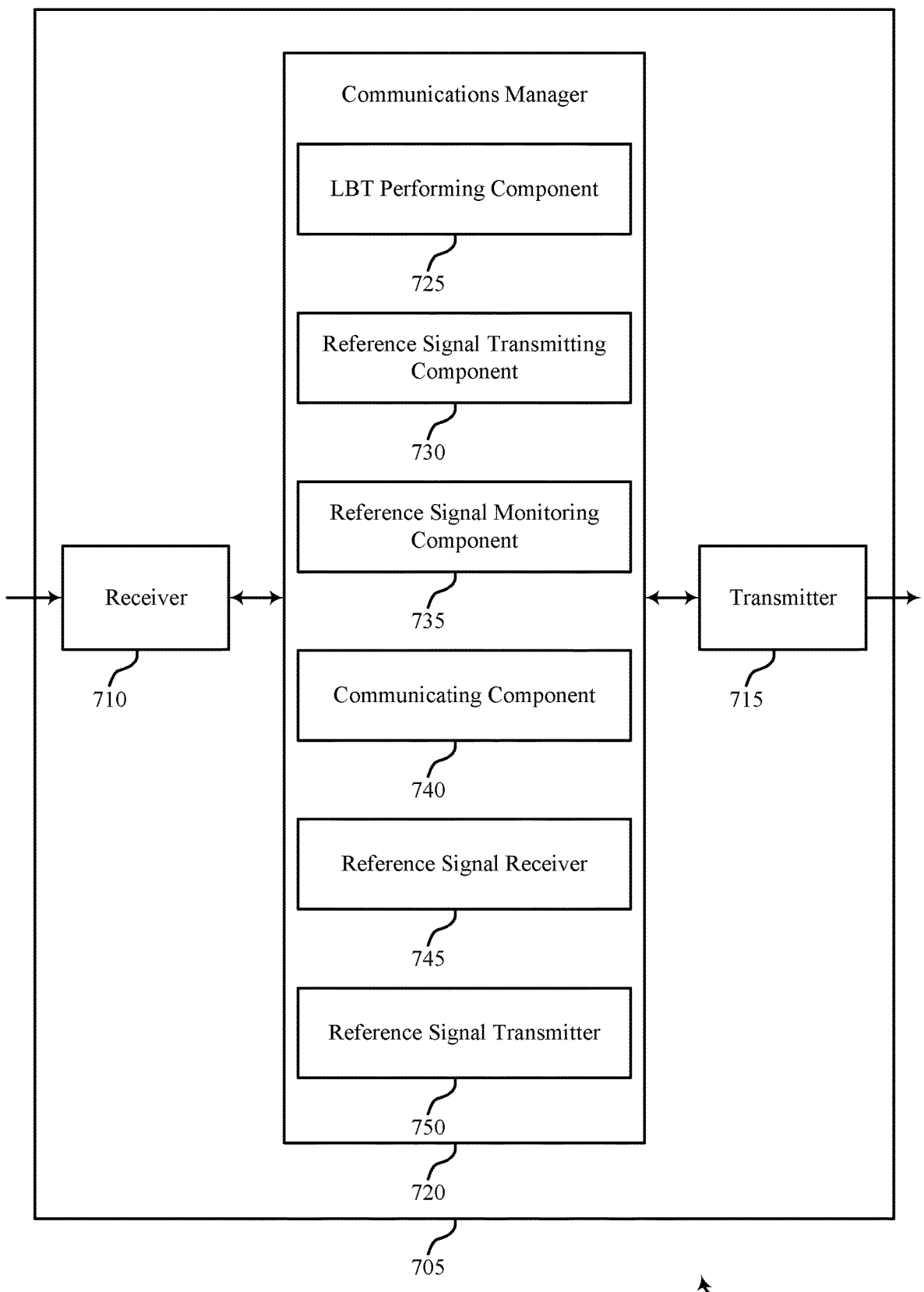

FIG. 7 shows a block diagram 700 of a device 705 that supports techniques for sidelink reference signal transmission in accordance with various aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for sidelink reference signal transmission). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for sidelink reference signal transmission). In some examples, the transmitter 715 may be co-located with a receiver 710 in a transceiver component. The transmitter 715 may utilize a single antenna or a set of multiple antennas.

The device 705, or various components thereof, may be an example of means for performing various aspects of techniques for sidelink reference signal transmission as described herein. For example, the communications manager 720 may include an LBT performing component 725, a reference signal transmitting component 730, a reference signal monitoring component 735, a communicating component 740, a reference signal receiver 745, a reference signal transmitter 750, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. The LBT performing component 725 may be configured as or otherwise support a means for performing an LBT associated with a sidelink reference signal transmission using a shared radio frequency spectrum band, the sidelink reference signal transmission associated with sidelink positioning for the first UE, a second UE, or both. The reference signal transmitting component 730 may be configured as or otherwise support a means for transmitting a first reference signal to the second UE using a first time resource, the first time resource based on a result of the performed LBT and a duration of the first reference signal. The reference signal monitoring component 735 may be configured as or otherwise support a means for monitoring for a second reference signal from the second UE using a second time resource, the second time resource based on the duration of the first reference signal.

Additionally or alternatively, the communications manager 720 may support wireless communications at a first UE in accordance with examples as disclosed herein. The communicating component 740 may be configured as or otherwise support a means for communicating with a second UE using a shared radio frequency spectrum band. The reference signal receiver 745 may be configured as or otherwise support a means for receiving a first reference signal from the second UE using a first time resource. The reference signal transmitter 750 may be configured as or otherwise support a means for transmitting a second reference signal to the second UE using a second time resource, the second time resource based on a duration of the received first reference signal.

Figure 8:
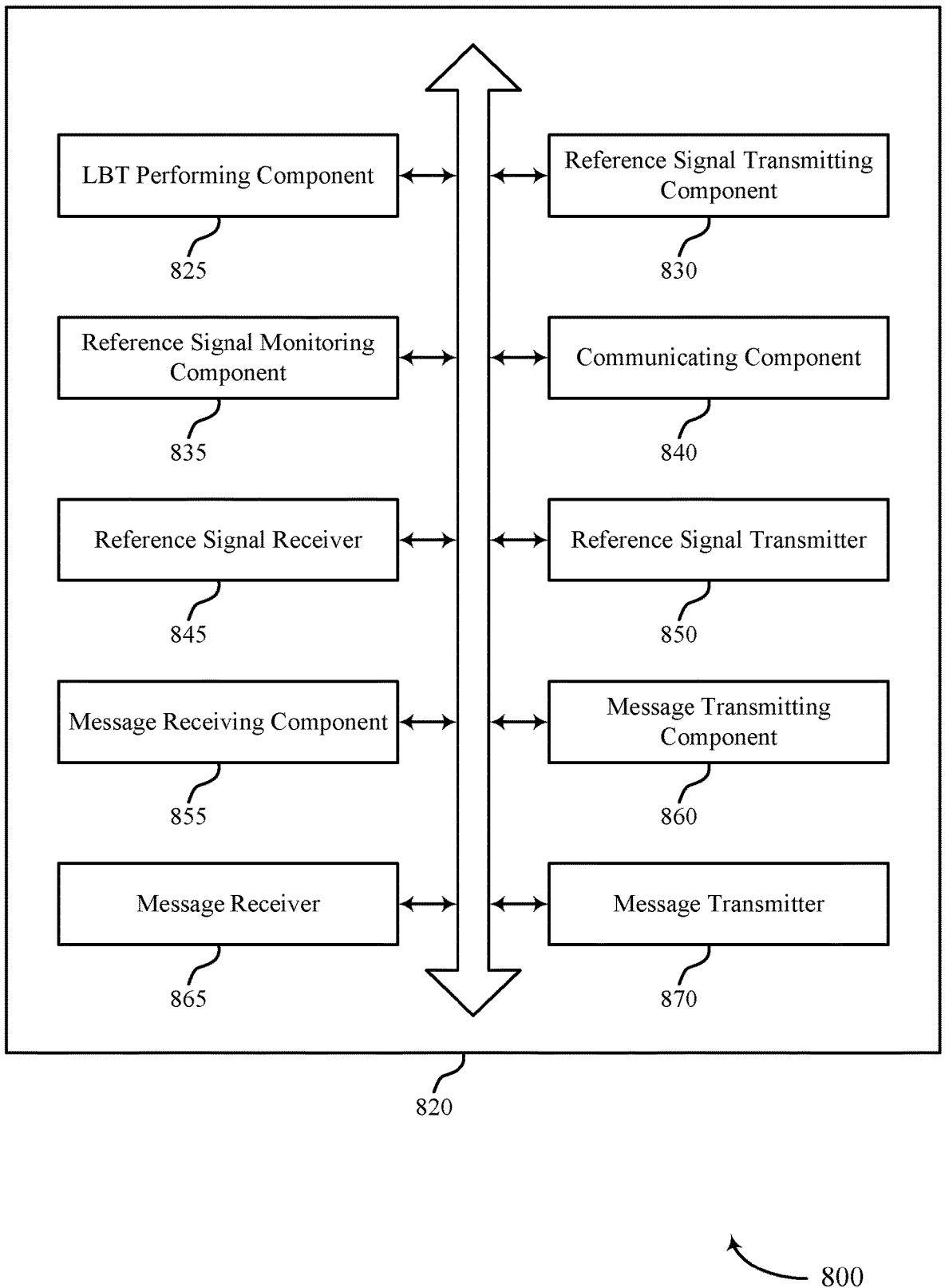
FIG. 8 shows a block diagram of a communications manager that supports techniques for sidelink reference signal transmission in accordance with various aspects of the present disclosure.

FIG. 8 shows a block diagram 800 of a communications manager 820 that supports techniques for sidelink reference signal transmission in accordance with various aspects of the present disclosure. The communications manager 820 may be an example of aspects of a communications manager 620, a communications manager 720, or both, as described herein. The communications manager 820, or various components thereof, may be an example of means for performing various aspects of techniques for sidelink reference signal transmission as described herein. For example, the communications manager 820 may include an LBT performing component 825, a reference signal transmitting component 830, a reference signal monitoring component 835, a communicating component 840, a reference signal receiver 845, a reference signal transmitter 850, a message receiving component 855, a message transmitting component 860, a message receiver 865, a message transmitter 870, or any combination thereof. Each of these components may communicate, directly or indirectly, with one another (e.g., via one or more buses).

The communications manager 820 may support wireless communications at a first UE in accordance with examples as disclosed herein. The LBT performing component 825 may be configured as or otherwise support a means for performing an LBT associated with a sidelink reference signal transmission using a shared radio frequency spectrum band, the sidelink reference signal transmission associated with sidelink positioning for the first UE, a second UE, or both. The reference signal transmitting component 830 may be configured as or otherwise support a means for transmitting a first reference signal to the second UE using a first time resource, the first time resource based on a result of the performed LBT and a duration of the first reference signal. In some examples, the duration of the first reference signal includes a quantity of symbols, the quantity of symbols greater than a first threshold quantity of symbols and less than a second threshold quantity of symbols.

The reference signal monitoring component 835 may be configured as or otherwise support a means for monitoring for a second reference signal from the second UE using a second time resource, the second time resource based on the duration of the first reference signal. In some examples, the monitoring for the second reference signal using the second time resource is based on maintaining a gap period between the first time resource and the second time resource.

In some examples, the message receiving component 855 may be configured as or otherwise support a means for receiving, from a base station, broadcast signaling indicating a reference signal configuration, where the duration of the first reference signal is based on the received broadcast signaling.

In some examples, the message receiving component 855 may be configured as or otherwise support a means for receiving a message from the second UE indicating a processing capability associated with the first reference signal, a processing time associated with the first reference signal, a requested duration of the first reference signal, or a combination thereof, where the duration of the first reference signal is based on the received message.

In some examples, the message transmitting component 860 may be configured as or otherwise support a means for transmitting a message to the second UE indicating a duration of the gap period.

In some examples, the reference signal monitoring component 835 may be configured as or otherwise support a means for monitoring for a third reference signal from a third UE using a third time resource, the third time resource based on the duration of the first reference signal. In some examples, the second time resource is before the third time resource. In some examples, the duration of the first reference signal is based on the first processing time at the second UE.

In some examples, the message receiving component 855 may be configured as or otherwise support a means for receiving signaling indicating a first processing time at the second UE and a second processing time at the third UE, where the first processing time at the second UE is greater than the second processing time at the third UE, and where the duration of the first reference signal is based on the first processing time at the second UE.

In some examples, the message transmitting component 860 may be configured as or otherwise support a means for transmitting a group configuration message to the second UE and the third UE, where monitoring for the second reference signal and the third reference signal is based on the transmitted group configuration message. In some examples, the group configuration message indicates a transmission order associated with the second reference signal and the third reference signal, a second duration of the second reference signal, a third duration of the third reference signal, or any combination thereof.

In some examples, the message receiving component 855 may be configured as or otherwise support a means for receiving signaling indicating a configuration associated with a second duration of the second reference signal, where monitoring for the second reference signal using the second time resource is based on the received signaling.

In some examples, the message transmitting component 860 may be configured as or otherwise support a means for transmitting a message to the second UE, the transmitted message indicating a second duration of the second reference signal, where monitoring for the second reference signal using the second time resource is based on the transmitted message.

In some examples, the LBT performing component 825 may be configured as or otherwise support a means for initiating a channel occupancy based on the result of the performed LBT, where the channel occupancy includes the first time resource and the second time resource.

Additionally or alternatively, the communications manager 820 may support wireless communications at a first UE in accordance with examples as disclosed herein. The communicating component 840 may be configured as or otherwise support a means for communicating with a second UE using a shared radio frequency spectrum band.

The reference signal receiver 845 may be configured as or otherwise support a means for receiving a first reference signal from the second UE using a first time resource. In some examples, the duration of the received first reference signal includes a quantity of symbols, the quantity of symbols greater than a first threshold quantity of symbols and less than a second threshold quantity of symbols.

The reference signal transmitter 850 may be configured as or otherwise support a means for transmitting a second reference signal to the second UE using a second time resource, the second time resource based on a duration of the received first reference signal. In some examples, the transmitted second reference signal is transmitted using the second time resource based on maintaining a gap period between the first time resource and the second time resource. In some examples, a second duration of the transmitted second reference signal includes a quantity of symbols, the quantity of symbols greater than a first threshold quantity of symbols and less than a second threshold quantity of symbols. In some examples, a second duration of the transmitted second reference signal is based on a processing capability associated with a third UE.

In some examples, the message receiver 865 may be configured as or otherwise support a means for receiving, from a base station, broadcast signaling indicating a reference signal configuration, where the duration of the received first reference signal is based on the received broadcast signaling.

In some examples, to support communicating with the second UE, the message transmitter 870 may be configured as or otherwise support a means for transmitting a message to the second UE, the transmitted message indicating a processing capability associated with the first reference signal, a processing time associated with the first reference signal, a requested duration of the first reference signal, or any combination thereof, where the duration of the received first reference signal is based on the transmitted message.

In some examples, to support communicating with the second UE, the message receiver 865 may be configured as or otherwise support a means for receiving a message from the second UE, the received message indicating a duration of the gap period.

In some examples, to support communicating with the second UE, the message receiver 865 may be configured as or otherwise support a means for receiving a group configuration message from the second UE, where the transmitted second reference signal is transmitted using the second time resource based on the received group configuration message. In some examples, the group configuration message indicates a transmission order associated with the transmitted second reference signal, a second duration of the transmitted second reference signal, or both.

In some examples, the message receiver 865 may be configured as or otherwise support a means for receiving signaling indicating a configuration associated with a second duration of the second reference signal, where the transmitted second reference signal is transmitted using the second time resource based on the received signaling.

In some examples, to support communicating with the second UE, the message receiver 865 may be configured as or otherwise support a means for receiving a message from the second UE, the received message indicating a second duration of the second reference signal, where the second reference signal is transmitted using the second time resource based on the transmitted message.

Figure 9:
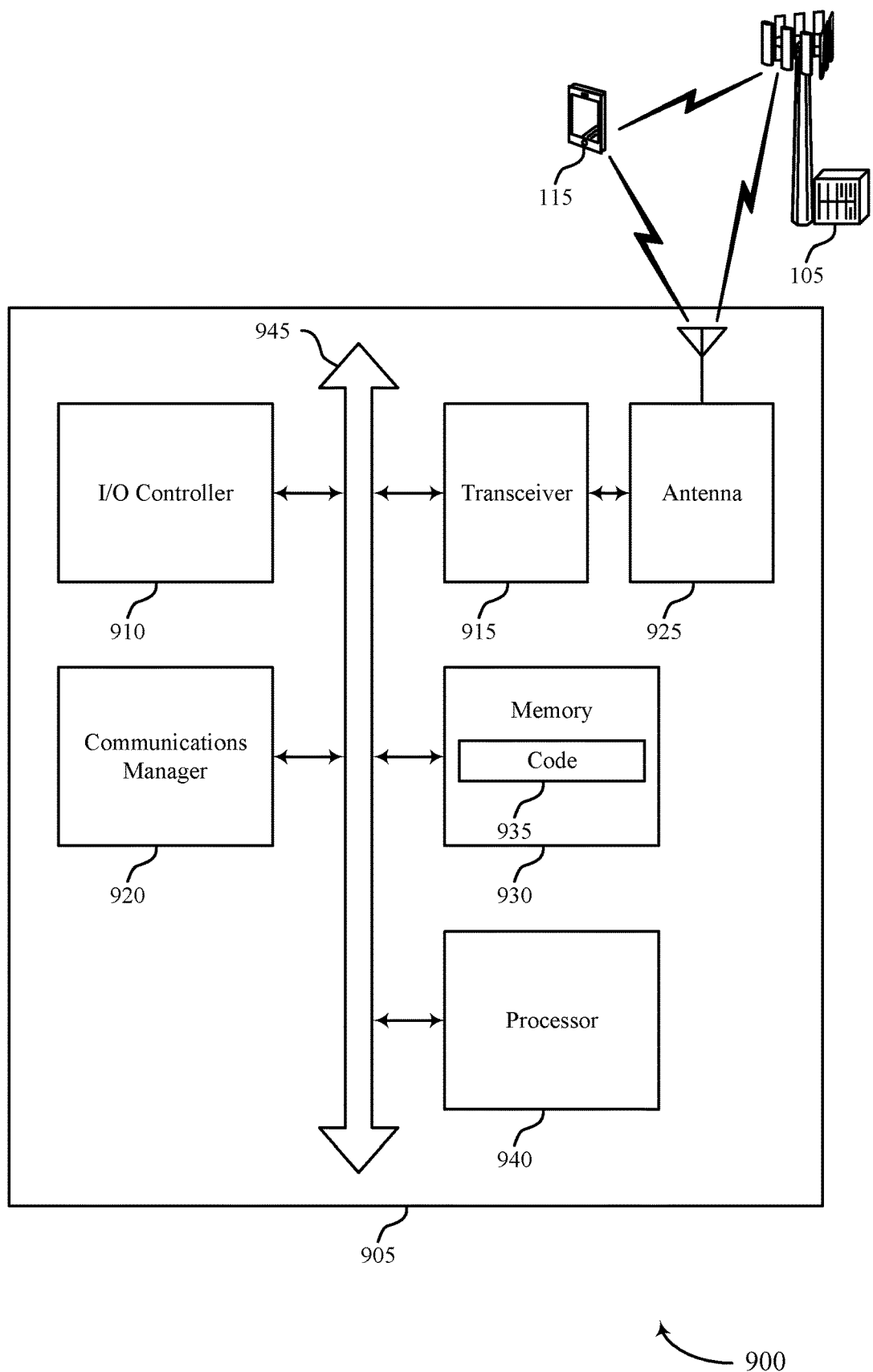
FIG. 9 shows a diagram of a system including a device that supports techniques for sidelink reference signal transmission in accordance with various aspects of the present disclosure.

FIG. 9 shows a diagram of a system 900 including a device 905 that supports techniques for sidelink reference signal transmission in accordance with various aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for sidelink reference signal transmission). For example, the device 905 or a component of the device 905 may include a processor 940 and memory 930 coupled to the processor 940, the processor 940 and memory 930 configured to perform various functions described herein.

The communications manager 920 may support wireless communications at a first UE in accordance with examples as disclosed herein. For example, the communications manager 920 may be configured as or otherwise support a means for performing an LBT associated with a sidelink reference signal transmission using a shared radio frequency spectrum band, the sidelink reference signal transmission associated with sidelink positioning for the first UE, a second UE, or both. The communications manager 920 may be configured as or otherwise support a means for transmitting a first reference signal to the second UE using a first time resource, the first time resource based on a result of the performed LBT and a duration of the first reference signal. The communications manager 920 may be configured as or otherwise support a means for monitoring for a second reference signal from the second UE using a second time resource, the second time resource based on the duration of the first reference signal.

Additionally or alternatively, the communications manager 920 may support wireless communications at a first UE in accordance with examples as disclosed herein. For example, the communications manager 920 may be configured as or otherwise support a means for communicating with a second UE using a shared radio frequency spectrum band. The communications manager 920 may be configured as or otherwise support a means for receiving a first reference signal from the second UE using a first time resource. The communications manager 920 may be configured as or otherwise support a means for transmitting a second reference signal to the second UE using a second time resource, the second time resource based on a duration of the received first reference signal.

By including or configuring the communications manager 920 in accordance with examples as described herein, the device 905 may support techniques for improved communication reliability and reduced latency based on exchanging PRSs in a shared COT. Exchanging PRSs in the shared COT may enable the device 905 to reduce a sidelink positioning delay of the second PRS. As a result, the device 905 may perform sidelink positioning with reduced latency and greater accuracy, among other benefits.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for sidelink reference signal transmission as described herein, or the processor 940 and the memory 930 may be otherwise configured to perform or support such operations.

Figure 10:
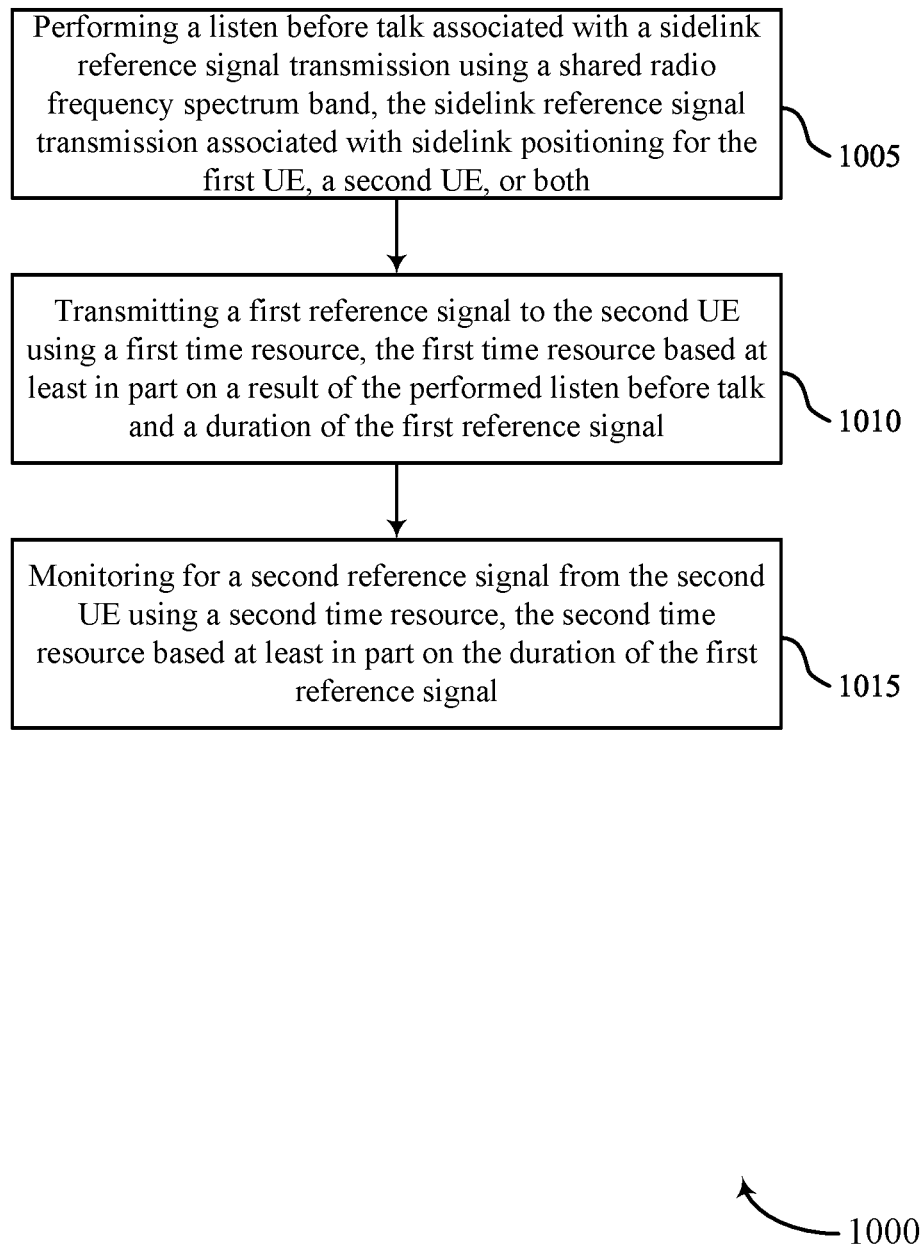
FIGS. 10 through 13 show flowcharts illustrating methods that support techniques for sidelink reference signal transmission in accordance with various aspects of the present disclosure.

FIG. 10 shows a flowchart illustrating a method 1000 that supports techniques for sidelink reference signal transmission in accordance with various aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include performing an LBT associated with a sidelink reference signal transmission using a shared radio frequency spectrum band, the sidelink reference signal transmission associated with sidelink positioning for the first UE, a second UE, or both. The operations of 1005 may be performed in accordance with examples as disclosed herein. In some examples, aspects of the operations of 1005 may be performed by an LBT performing component 825 as described with reference to FIG. 8.

At 1010, the method may include transmitting a first reference signal to the second UE using a first time resource, the first time resource based on a result of the performed LBT and a duration of the first reference signal. The operations of 1010 may be performed in accordance with examples as disclosed herein. In some examples, aspects of the operations of 1010 may be performed by a reference signal transmitting component 830 as described with reference to FIG. 8.

At 1015, the method may include monitoring for a second reference signal from the second UE using a second time resource, the second time resource based on the duration of the first reference signal. The operations of 1015 may be performed in accordance with examples as disclosed herein. In some examples, aspects of the operations of 1015 may be performed by a reference signal monitoring component 835 as described with reference to FIG. 8.

Figure 11:
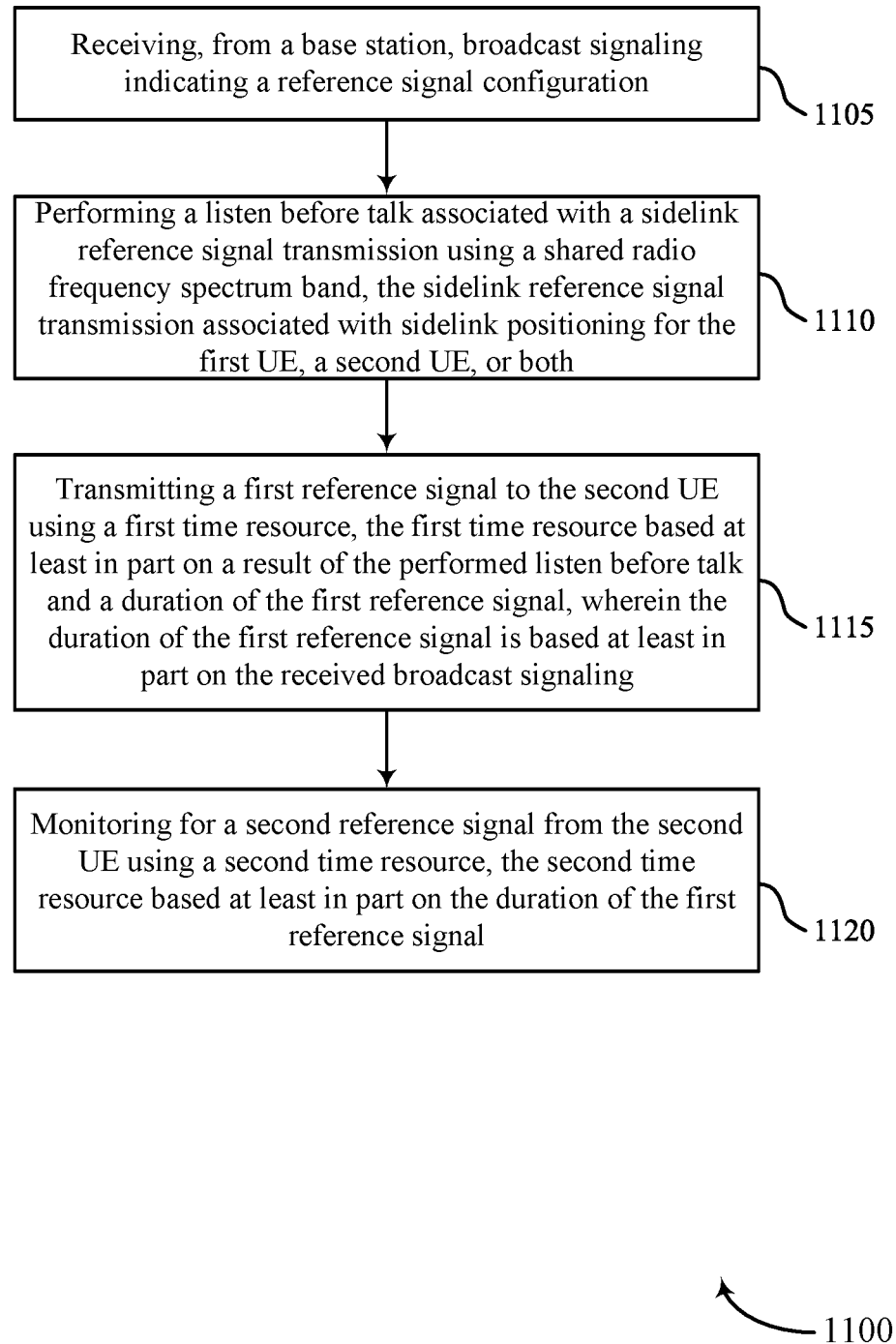

FIG. 11 shows a flowchart illustrating a method 1100 that supports techniques for sidelink reference signal transmission in accordance with various aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include receiving, from a base station, broadcast signaling indicating a reference signal configuration, where the duration of the first reference signal is based on the received broadcast signaling. The operations of 1105 may be performed in accordance with examples as disclosed herein. In some examples, aspects of the operations of 1105 may be performed by a message receiving component 855 as described with reference to FIG. 8.

At 1110, the method may include performing an LBT associated with a sidelink reference signal transmission using a shared radio frequency spectrum band, the sidelink reference signal transmission associated with sidelink positioning for the first UE, a second UE, or both. The operations of 1110 may be performed in accordance with examples as disclosed herein. In some examples, aspects of the operations of 1110 may be performed by an LBT performing component 825 as described with reference to FIG. 8.

At 1115, the method may include transmitting a first reference signal to the second UE using a first time resource, the first time resource based on a result of the performed LBT and a duration of the first reference signal. The operations of 1115 may be performed in accordance with examples as disclosed herein. In some examples, aspects of the operations of 1115 may be performed by a reference signal transmitting component 830 as described with reference to FIG. 8.

At 1120, the method may include monitoring for a second reference signal from the second UE using a second time resource, the second time resource based on the duration of the first reference signal. The operations of 1120 may be performed in accordance with examples as disclosed herein. In some examples, aspects of the operations of 1120 may be performed by a reference signal monitoring component 835 as described with reference to FIG. 8.

Figure 12:
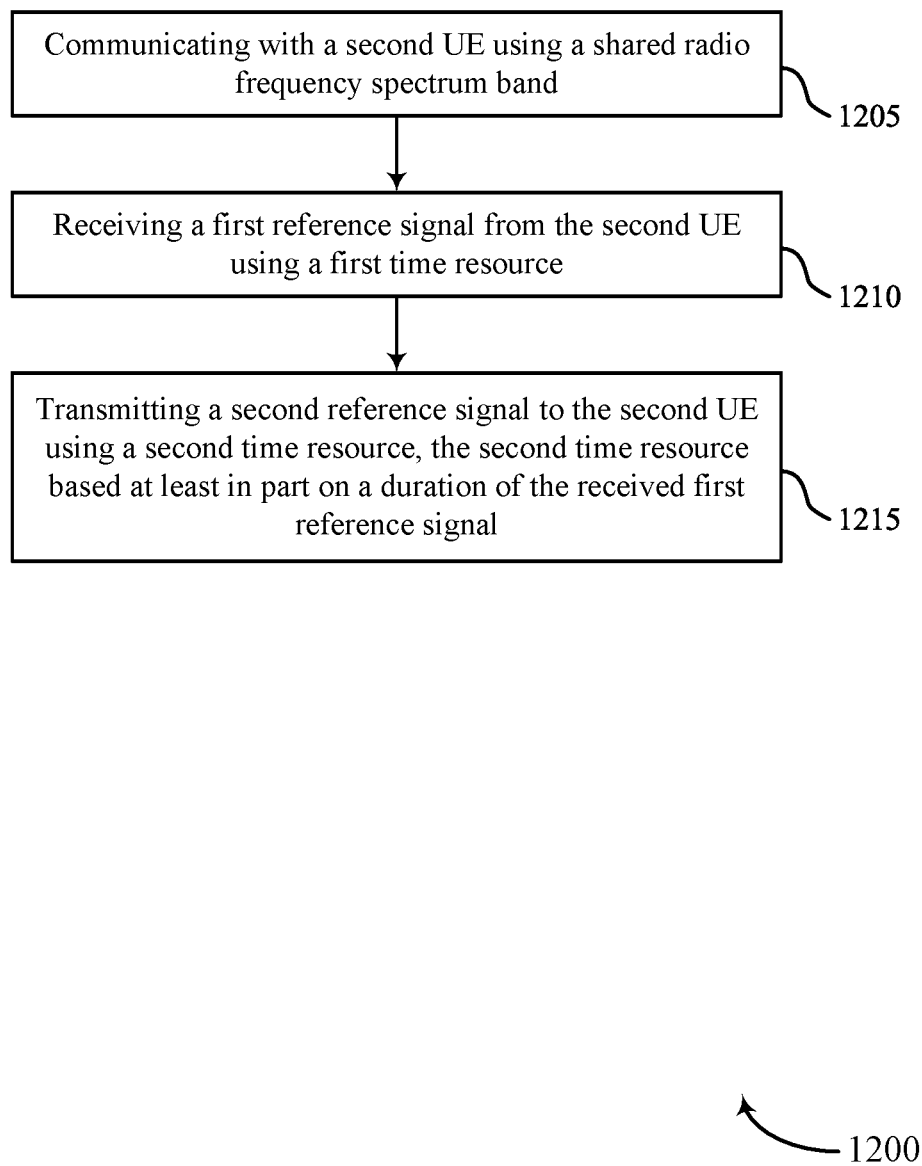

FIG. 12 shows a flowchart illustrating a method 1200 that supports techniques for sidelink reference signal transmission in accordance with various aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include communicating with a second UE using a shared radio frequency spectrum band. The operations of 1205 may be performed in accordance with examples as disclosed herein. In some examples, aspects of the operations of 1205 may be performed by a communicating component 840 as described with reference to FIG. 8.

At 1210, the method may include receiving a first reference signal from the second UE using a first time resource. The operations of 1210 may be performed in accordance with examples as disclosed herein. In some examples, aspects of the operations of 1210 may be performed by a reference signal receiver 845 as described with reference to FIG. 8.

At 1215, the method may include transmitting a second reference signal to the second UE using a second time resource, the second time resource based on a duration of the received first reference signal. The operations of 1215 may be performed in accordance with examples as disclosed herein. In some examples, aspects of the operations of 1215 may be performed by a reference signal transmitter 850 as described with reference to FIG. 8.

Figure 13:
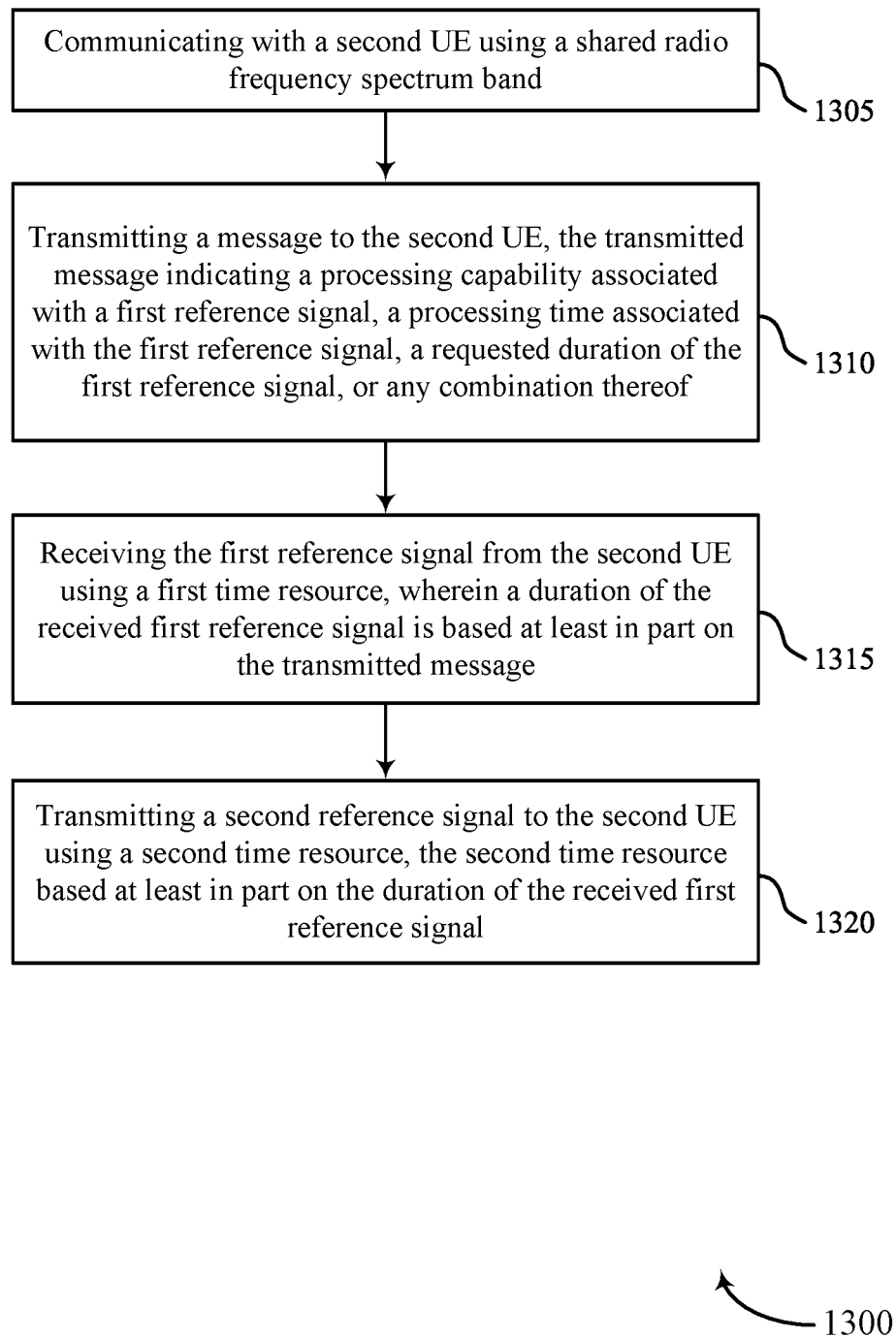

FIG. 13 shows a flowchart illustrating a method 1300 that supports techniques for sidelink reference signal transmission in accordance with various aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include communicating with a second UE using a shared radio frequency spectrum band. The operations of 1305 may be performed in accordance with examples as disclosed herein. In some examples, aspects of the operations of 1305 may be performed by a communicating component 840 as described with reference to FIG. 8.

At 1310, the method may include transmitting a message to the second UE, the transmitted message indicating a processing capability associated with the first reference signal, a processing time associated with the first reference signal, a requested duration of the first reference signal, or any combination thereof, where the duration of the received first reference signal is based on the transmitted message. The operations of 1310 may be performed in accordance with examples as disclosed herein. In some examples, aspects of the operations of 1310 may be performed by a message transmitter 870 as described with reference to FIG. 8.

At 1315, the method may include receiving a first reference signal from the second UE using a first time resource. The operations of 1315 may be performed in accordance with examples as disclosed herein. In some examples, aspects of the operations of 1315 may be performed by a reference signal receiver 845 as described with reference to FIG. 8.

At 1320, the method may include transmitting a second reference signal to the second UE using a second time resource, the second time resource based on a duration of the received first reference signal. The operations of 1320 may be performed in accordance with examples as disclosed herein. In some examples, aspects of the operations of 1320 may be performed by a reference signal transmitter 850 as described with reference to FIG. 8.

The following provides an overview of aspects of the present disclosure:

Aspect 1: A method for wireless communications at a first UE, comprising: performing a listen before talk associated with a sidelink reference signal transmission using a shared radio frequency spectrum band, the sidelink reference signal transmission associated with sidelink positioning for the first UE, a second UE, or both; transmitting a first reference signal to the second UE using a first time resource, the first time resource based at least in part on a result of the performed listen before talk and a duration of the first reference signal; and monitoring for a second reference signal from the second UE using a second time resource, the second time resource based at least in part on the duration of the first reference signal.

Aspect 2: The method of aspect 1, further comprising: receiving, from a base station, broadcast signaling indicating a reference signal configuration, wherein the duration of the first reference signal is based at least in part on the received broadcast signaling.

Aspect 3: The method of any of aspects 1 through 2, further comprising: receiving a message from the second UE indicating a processing capability associated with the first reference signal, a processing time associated with the first reference signal, a requested duration of the first reference signal, or a combination thereof, wherein the duration of the first reference signal is based at least in part on the received message.

Aspect 4: The method of any of aspects 1 through 3, wherein the monitoring for the second reference signal using the second time resource is based at least in part on maintaining a gap period between the first time resource and the second time resource.

Aspect 5: The method of aspect 4, further comprising: transmitting a message to the second UE indicating a duration of the gap period.

Aspect 6: The method of any of aspects 1 through 5, further comprising: monitoring for a third reference signal from a third UE using a third time resource, the third time resource based at least in part on the duration of the first reference signal.

Aspect 7: The method of aspect 6, further comprising: receiving signaling indicating a first processing time at the second UE and a second processing time at the third UE, wherein the first processing time at the second UE is greater than the second processing time at the third UE, and wherein the duration of the first reference signal is based at least in part on the first processing time at the second UE.

Aspect 8: The method of aspect 7, wherein the second time resource is before the third time resource; and the duration of the first reference signal is based at least in part on the first processing time at the second UE.

Aspect 9: The method of any of aspects 6 through 8, further comprising: transmitting a group configuration message to the second UE and the third UE, wherein monitoring for the second reference signal and the third reference signal is based at least in part on the transmitted group configuration message.

Aspect 10: The method of aspect 9, wherein the group configuration message indicates a transmission order associated with the second reference signal and the third reference signal, a second duration of the second reference signal, a third duration of the third reference signal, or any combination thereof.

Aspect 11: The method of any of aspects 1 through 10, further comprising: receiving signaling indicating a configuration associated with a second duration of the second reference signal, wherein monitoring for the second reference signal using the second time resource is based at least in part on the received signaling.

Aspect 12: The method of any of aspects 1 through 11, wherein the duration of the first reference signal includes a quantity of symbols, the quantity of symbols greater than a first threshold quantity of symbols and less than a second threshold quantity of symbols.

Aspect 13: The method of any of aspects 1 through 12, further comprising: transmitting a message to the second UE, the transmitted message indicating a second duration of the second reference signal, wherein monitoring for the second reference signal using the second time resource is based at least in part on the transmitted message.

Aspect 14: The method of any of aspects 1 through 13, further comprising: initiating a channel occupancy based at least in part on the result of the performed listen before talk, wherein the channel occupancy comprises the first time resource and the second time resource.

Aspect 15: A method for wireless communications at a first UE, comprising: communicating with a second UE using a shared radio frequency spectrum band; receiving a first reference signal from the second UE using a first time resource; and transmitting a second reference signal to the second UE using a second time resource, the second time resource based at least in part on a duration of the received first reference signal.

Aspect 16: The method of aspect 15, further comprising: receiving, from a base station, broadcast signaling indicating a reference signal configuration, wherein the duration of the received first reference signal is based at least in part on the received broadcast signaling.

Aspect 17: The method of any of aspects 15 through 16, wherein communicating with the second UE comprises: transmitting a message to the second UE, the transmitted message indicating a processing capability associated with the first reference signal, a processing time associated with the first reference signal, a requested duration of the first reference signal, or any combination thereof, wherein the duration of the received first reference signal is based at least in part on the transmitted message.

Aspect 18: The method of any of aspects 15 through 17, wherein the transmitted second reference signal is transmitted using the second time resource based at least in part on maintaining a gap period between the first time resource and the second time resource.

Aspect 19: The method of aspect 18, wherein communicating with the second UE comprises: receiving a message from the second UE, the received message indicating a duration of the gap period.

Aspect 20: The method of any of aspects 15 through 19, wherein communicating with the second UE comprises:

receiving a group configuration message from the second UE, wherein the transmitted second reference signal is transmitted using the second time resource based at least in part on the received group configuration message.

Aspect 21: The method of aspect 20, wherein the group configuration message indicates a transmission order associated with the transmitted second reference signal, a second duration of the transmitted second reference signal, or both.

Aspect 22: The method of any of aspects 15 through 21, further comprising: receiving signaling indicating a configuration associated with a second duration of the second reference signal, wherein the transmitted second reference signal is transmitted using the second time resource based at least in part on the received signaling.

Aspect 23: The method of any of aspects 15 through 22, wherein the duration of the received first reference signal includes a quantity of symbols, the quantity of symbols greater than a first threshold quantity of symbols and less than a second threshold quantity of symbols.

Aspect 24: The method of any of aspects 15 through 23, wherein a second duration of the transmitted second reference signal includes a quantity of symbols, the quantity of symbols greater than a first threshold quantity of symbols and less than a second threshold quantity of symbols.

Aspect 25: The method of any of aspects 15 through 24, wherein a second duration of the transmitted second reference signal is based at least in part on a processing capability associated with a third UE.

Aspect 26: The method of any of aspects 15 through 25, wherein communicating with the second UE comprises: receiving a message from the second UE, the received message indicating a second duration of the second reference signal, wherein the second reference signal is transmitted using the second time resource based at least in part on the transmitted message.

Aspect 27: An apparatus for wireless communications at a first UE, comprising a processor; memory coupled with the processor; and instructions stored in the memory and executable by the processor to cause the apparatus to perform a method of any of aspects 1 through 14.

Aspect 28: An apparatus for wireless communications at a first UE, comprising at least one means for performing a method of any of aspects 1 through 14.

Aspect 29: A non-transitory computer-readable medium storing code for wireless communications at a first UE, the code comprising instructions executable by a processor to perform a method of any of aspects 1 through 14.

Aspect 30: An apparatus for wireless communications at a first UE, comprising a processor; memory coupled with the processor; and instructions stored in the memory and executable by the processor to cause the apparatus to perform a method of any of aspects 15 through 26.

Aspect 31: An apparatus for wireless communications at a first UE, comprising at least one means for performing a method of any of aspects 15 through 26.

Aspect 32: A non-transitory computer-readable medium storing code for wireless communications at a first UE, the code comprising instructions executable by a processor to perform a method of any of aspects 15 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication by a first user equipment (UE), comprising:

receiving signaling that indicates a reference signal configuration;
receiving a message from a second UE indicating a processing capability associated with a first reference signal, a processing time associated with the first reference signal, a requested duration of the first reference signal, or a combination thereof;
performing a listen before talk (LBT) operation using a shared radio frequency spectrum band, the LBT operation including at least one sidelink reference signal transmission associated with sidelink positioning between the first UE and the second UE;
transmitting the first reference signal to the second UE using a first resource of the shared radio frequency spectrum band based at least in part on a result of the performed LBT operation, wherein a duration of the transmitted first reference signal comprises a quantity of symbols that is based at least in part on the reference signal configuration and the processing time of the second UE and wherein the quantity of symbols of the duration of the transmitted first reference signal is based at least in part on the message; and
monitoring for a second reference signal from the second UE using a second resource of the shared radio frequency spectrum band, wherein a duration of the second resource begins after the duration of the transmitted first reference signal.

2. The method of claim 1, wherein receiving the signaling comprises:
receiving broadcast signaling that indicates the reference signal configuration, wherein the duration of the first reference signal is based at least in part on the received broadcast signaling.

3. The method of claim 1, wherein the monitoring for the second reference signal using the second resource is based at least in part on maintaining a gap period between the first resource and the second resource.

4. The method of claim 3, further comprising:
transmitting a second message to the second UE indicating a duration of the gap period.

5. The method of claim 1, further comprising:
monitoring for a third reference signal from a third UE using a third resource, the third resource based at least in part on the duration of the first reference signal.

6. The method of claim 5, further comprising:
receiving second signaling that indicates a first processing time at the second UE and a second processing time at the third UE, wherein the first processing time at the second UE is greater than the second processing time at the third UE, and wherein the duration of the first reference signal is based at least in part on the first processing time at the second UE.

7. The method of claim 6, wherein:
the second resource is before the third resource; and
the duration of the first reference signal is based at least in part on the first processing time at the second UE.

8. The method of claim 5, further comprising:
transmitting a group configuration message to the second UE and the third UE, wherein monitoring for the second reference signal and the third reference signal is based at least in part on the transmitted group configuration message.

9. The method of claim 8, wherein the group configuration message indicates a transmission order associated with the second reference signal and the third reference signal, a second duration of the second reference signal, a third duration of the third reference signal, or any combination thereof.

10. The method of claim 1, further comprising:
receiving signaling that indicates a configuration associated with a second duration of the second reference signal, wherein monitoring for the second reference signal using the second resource is based at least in part on the received signaling.

11. The method of claim 1, wherein the quantity of symbols of the duration of the first reference signal is greater than a first threshold quantity of symbols and less than a second threshold quantity of symbols.

12. The method of claim 1, further comprising:
transmitting a second message to the second UE, the transmitted second message indicating a second duration of the second reference signal, wherein monitoring for the second reference signal using the second resource is based at least in part on the transmitted second message.

13. The method of claim 1, further comprising:
initiating a channel occupancy based at least in part on the result of the performed LBT operation, wherein the channel occupancy comprises the first resource and the second resource.

14. A method for wireless communications at a first user equipment (UE), comprising:
receiving signaling that indicates a reference signal configuration;
transmitting a message to a second UE, the transmitted message indicating a processing capability associated with the first reference signal, a processing time associated with the first reference signal, a requested duration of the first reference signal, or any combination thereof;
communicating with the second UE using a shared radio frequency spectrum band based at least in part on a result of a listen before talk (LBT) operation that includes at least one sidelink reference signal transmission associated with sidelink positioning between the first UE and the second UE;
receiving the first reference signal from the second UE using a first resource of the shared radio frequency spectrum band, wherein a duration of the received first reference signal comprises a quantity of symbols that is based at least in part on the reference signal configuration and the processing time of the first UE and wherein the quantity of symbols of the duration of the received first reference signal is based at least in part on the message; and
transmitting a second reference signal to the second UE using a second resource of the shared radio frequency spectrum band, wherein a duration of the second resource begins after the duration of the received first reference signal.

15. The method of claim 14, wherein receiving the signaling comprises:
receiving broadcast signaling that indicates the reference signal configuration, wherein the duration of the received first reference signal is based at least in part on the received broadcast signaling.

16. The method of claim 14, wherein the transmitted second reference signal is transmitted using the second resource based at least in part on maintaining a gap period between the first resource and the second resource.

17. The method of claim 16, wherein communicating with the second UE comprises:

receiving a second message from the second UE, the received second message indicating a duration of the gap period between the first resource and the second resource.

18. The method of claim 14, wherein communicating with the second UE comprises:
receiving a group configuration message from the second UE, wherein the transmitted second reference signal is transmitted using the second resource based at least in part on the received group configuration message.

19. The method of claim 18, wherein the group configuration message indicates a transmission order associated with the transmitted second reference signal, a second duration of the transmitted second reference signal, or both.

20. The method of claim 14, further comprising:
receiving second signaling that indicates a configuration associated with a second duration of the second reference signal, wherein the transmitted second reference signal is transmitted using the second resource based at least in part on the received signaling.

21. The method of claim 14, wherein the quantity of symbols of the duration of the received first reference signal is greater than a first threshold quantity of symbols and less than a second threshold quantity of symbols.

22. The method of claim 14, wherein a second duration of the transmitted second reference signal includes a quantity of symbols, the quantity of symbols greater than a first threshold quantity of symbols and less than a second threshold quantity of symbols.

23. The method of claim 14, wherein a second duration of the transmitted second reference signal is based at least in part on a processing capability associated with a third UE.

24. The method of claim 14, wherein communicating with the second UE comprises:
receiving a second message from the second UE, the received second message indicating a second duration of the second reference signal, wherein the second reference signal is transmitted using the second resource based at least in part on the received second message.

25. An apparatus for wireless communications at a first user equipment (UE), comprising:
one or more processors;
memory coupled with the one or more processors; and
instructions stored in the memory and executable by the one or more processors to cause the apparatus to:
receive signaling that indicates a reference signal configuration;
receive a message from a second UE indicating a processing capability associated with a first reference signal, a processing time associated with the first reference signal, a requested duration of the first reference signal, or a combination thereof;
perform a listen before talk (LBT) operation using a shared radio frequency spectrum band, the LBT operation including at least one sidelink reference signal transmission associated with sidelink positioning between the first UE and the second UE;
transmit the first reference signal to the second UE using a first resource of the shared radio frequency spectrum band based at least in part on a result of the performed LBT operation, wherein a duration of the transmitted first reference signal comprises a quantity of symbols that is based at least in part on the reference signal configuration and the processing time of the second UE and wherein the quantity of symbols of the duration of the transmitted first reference signal is based at least in part on the message; and monitor for a second reference signal from the second UE using a second resource of the shared radio frequency spectrum band, wherein a duration of the second resource begins after the duration of the transmitted first reference signal.

26. The apparatus of claim 25, wherein the instructions to receive the signaling are executable by the one or more processors to cause the apparatus to:

receive broadcast signaling that indicates the reference signal configuration, wherein the duration of the first reference signal is based at least in part on the received broadcast signaling.

27. An apparatus for wireless communications at a first user equipment (UE), comprising:

one or more processors;

memory coupled with the one or more processors; and instructions stored in the memory and executable by the one or more processors to cause the apparatus to:

receive signaling that indicates a reference signal configuration;

transmit a message to a second UE, the transmitted message indicating a processing capability associated with the first reference signal, a processing time associated with the first reference signal, a requested duration of the first reference signal, or any combination thereof;

communicate with the second UE using a shared radio frequency spectrum band based at least in part on a result of a listen before talk (LBT) operation that includes at least one sidelink reference signal transmission associated with sidelink positioning between the first UE and the second UE;

receive the first reference signal from the second UE using a first resource of the shared radio frequency spectrum band, wherein a duration of the received first reference signal comprises a quantity of symbols that is based at least in part on the reference signal configuration and the processing time of the first UE and wherein the quantity of symbols of the duration of the received first reference signal is based at least in part on the message; and transmit a second reference signal to the second UE using a second resource of the shared radio frequency spectrum band, wherein a duration of the second resource begins after the duration of the received first reference signal.

28. The apparatus of claim 27, wherein the instructions to receive the signaling are executable by the one or more processors to cause the apparatus to:

receive broadcast signaling that indicates the reference signal configuration, wherein the duration of the received first reference signal is based at least in part on the received broadcast signaling.

* * * * *